US009590814B2

(12) United States Patent
Pazos et al.

(10) Patent No.: US 9,590,814 B2
(45) Date of Patent: Mar. 7, 2017

(54) METHOD AND APPARATUS FOR TRANSPORT OF DYNAMIC ADAPTIVE STREAMING OVER HTTP (DASH) INITIALIZATION SEGMENT DESCRIPTION FRAGMENTS AS USER SERVICE DESCRIPTION FRAGMENTS

(75) Inventors: Carlos M. D. Pazos, San Diego, CA (US); Nagaraju Naik, San Diego, CA (US); Charles Nung Lo, San Diego, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/563,659

(22) Filed: Jul. 31, 2012

(65) Prior Publication Data
US 2013/0036234 A1    Feb. 7, 2013

Related U.S. Application Data

(60) Provisional application No. 61/513,992, filed on Aug. 1, 2011.

(51) Int. Cl.
*G06F 15/16* (2006.01)
*H04L 12/18* (2006.01)
(Continued)

(52) U.S. Cl.
CPC ............ *H04L 12/189* (2013.01); *H04L 12/18* (2013.01); *H04L 65/00* (2013.01);
(Continued)

(58) Field of Classification Search
CPC .................... H04L 12/189; H04L 65/1036
(Continued)

(56) References Cited

U.S. PATENT DOCUMENTS 8,111,694 B2    2/2012  Pohjolainen et al.
2005/0207415 A1*  9/2005  Curcio ............... H04L 67/14
                                                  370/390
(Continued)

FOREIGN PATENT DOCUMENTS

EP          2200220 A1    6/2010
JP          2004112425 A   4/2004
(Continued)

OTHER PUBLICATIONS

U.S. Appl. No. "61/471,042", filed Apr. 1, 2011.*
(Continued)

*Primary Examiner* — Kevin Bates
*Assistant Examiner* — Mark A Scott
(74) *Attorney, Agent, or Firm* — Arent Fox LLP

(57) ABSTRACT

A method, an apparatus, and a computer program product for wireless communication are provided. The apparatus establishes a file delivery session with a server in a broadcast network for system information. The apparatus also receives a plurality of metadata fragments in the file delivery session. The plurality of metadata fragments including at least one initialization segment description fragment, wherein the at least one initialization segment description fragment is associated with at least one media segment transmitted in another file delivery session.

61 Claims, 26 Drawing Sheets

(51) Int. Cl.
- *H01L 29/06* (2006.01)
- *H04L 29/08* (2006.01)
- *H04L 29/06* (2006.01)

(52) U.S. Cl.
CPC ...... *H04L 65/1006* (2013.01); *H04L 65/1016* (2013.01); *H04L 65/1036* (2013.01)

(58) Field of Classification Search
USPC ........................................................ 709/231
See application file for complete search history.

(56) References Cited

U.S. PATENT DOCUMENTS

| | | | |
|---|---|---|---|
| 2006/0224970 A1* | 10/2006 | Bodin | G06Q 30/02 715/753 |
| 2007/0041377 A1* | 2/2007 | Song et al. | 370/389 |
| 2007/0147411 A1 | 6/2007 | Bijwaard et al. | |
| 2007/0169149 A1* | 7/2007 | Jennings | H04N 7/165 725/58 |
| 2007/0174474 A1* | 7/2007 | Zhong | H04L 29/06027 709/230 |
| 2007/0240189 A1* | 10/2007 | Paila | 725/62 |
| 2008/0005767 A1* | 1/2008 | Seo | H04N 7/163 725/62 |
| 2008/0155596 A1* | 6/2008 | Rosberg et al. | 725/39 |
| 2008/0201746 A1* | 8/2008 | Xu | H04H 60/72 725/54 |
| 2009/0083794 A1* | 3/2009 | Lee et al. | 725/39 |
| 2009/0089535 A1* | 4/2009 | Lohmar | H04L 67/06 711/173 |
| 2009/0175183 A1* | 7/2009 | Mochizuki et al. | 370/252 |
| 2009/0187593 A1 | 7/2009 | Chen et al. | |
| 2009/0189792 A1* | 7/2009 | Shokrollahi | H03M 13/1102 341/51 |
| 2009/0249027 A1* | 10/2009 | Kim | H04L 25/03866 712/5 |
| 2009/0300690 A1* | 12/2009 | Xu | H04H 20/22 725/62 |
| 2009/0316615 A1* | 12/2009 | Vedantham et al. | 370/312 |
| 2010/0043026 A1* | 2/2010 | De Cuetos | H04H 20/28 725/40 |
| 2010/0169504 A1* | 7/2010 | Gabin | H04L 65/80 709/231 |
| 2010/0250633 A1* | 9/2010 | Hannuksela et al. | 707/825 |
| 2010/0299702 A1* | 11/2010 | Lo et al. | 725/39 |
| 2010/0318600 A1* | 12/2010 | Furbeck | 709/203 |
| 2011/0096828 A1* | 4/2011 | Chen | H04N 21/23106 375/240.02 |
| 2011/0119394 A1* | 5/2011 | Wang et al. | 709/231 |
| 2011/0119396 A1* | 5/2011 | Kwon | H04N 21/23439 709/231 |
| 2011/0238789 A1* | 9/2011 | Luby | H04N 21/23106 709/219 |
| 2011/0239078 A1* | 9/2011 | Luby | H04N 21/23106 714/752 |
| 2011/0307545 A1* | 12/2011 | Bouazizi | H04N 21/234345 709/203 |
| 2012/0011550 A1* | 1/2012 | Holland | H04N 21/4126 725/78 |
| 2012/0082207 A1* | 4/2012 | Jiang | H04N 19/30 375/240.2 |
| 2012/0099593 A1* | 4/2012 | Luby | H04L 1/0056 370/392 |
| 2012/0110120 A1* | 5/2012 | Willig | H04L 65/1016 709/217 |
| 2012/0144445 A1* | 6/2012 | Bonta | H04L 12/1868 725/116 |
| 2012/0151009 A1* | 6/2012 | Bouazizi | H04L 41/5067 709/219 |
| 2012/0166667 A1* | 6/2012 | Hall | H04L 65/607 709/231 |
| 2012/0209952 A1* | 8/2012 | Lotfallah et al. | 709/217 |
| 2012/0233345 A1* | 9/2012 | Hannuksela | H04N 21/26258 709/231 |
| 2012/0239785 A1* | 9/2012 | Pazos | 709/219 |
| 2012/0254456 A1* | 10/2012 | Visharam et al. | 709/231 |
| 2012/0259994 A1* | 10/2012 | Gillies | H04L 12/1881 709/231 |
| 2012/0288031 A1* | 11/2012 | Vare et al. | 375/316 |
| 2012/0290644 A1* | 11/2012 | Gabin et al. | 709/203 |
| 2012/0331508 A1* | 12/2012 | Vare et al. | 725/50 |
| 2013/0014202 A1* | 1/2013 | Suh | H04H 20/93 725/131 |
| 2013/0034032 A1* | 2/2013 | Vare et al. | 370/310 |
| 2013/0036234 A1* | 2/2013 | Pazos et al. | 709/231 |
| 2013/0117413 A1* | 5/2013 | Kaneko | H04N 21/438 709/217 |
| 2013/0124749 A1* | 5/2013 | Thang | H04L 65/4092 709/231 |
| 2013/0125187 A1* | 5/2013 | Kim | H04N 21/23608 725/109 |
| 2013/0170561 A1* | 7/2013 | Hannuksela | H04N 21/23424 375/240.25 |
| 2013/0212166 A1* | 8/2013 | Willig | H04L 65/1016 709/203 |
| 2013/0238758 A1* | 9/2013 | Lee | H04N 21/23439 709/218 |
| 2013/0279375 A1* | 10/2013 | Newberg | H04W 88/16 370/260 |
| 2013/0290493 A1* | 10/2013 | Oyman | H04W 72/0413 709/219 |
| 2014/0115647 A1* | 4/2014 | Kim | H04N 21/23439 725/110 |
| 2014/0245359 A1* | 8/2014 | De Foy | H04N 21/6181 725/62 |
| 2015/0131657 A1* | 5/2015 | Oyman | H04W 56/00 370/390 |
| 2016/0021036 A1 | 1/2016 | Choi et al. | |

FOREIGN PATENT DOCUMENTS

| | | |
|---|---|---|
| RU | 2364922 C2 | 8/2009 |
| RU | 2419251 C2 | 5/2011 |
| WO | 2005111836 A3 | 9/2006 |
| WO | 2009091995 | 7/2009 |
| WO | WO2010045511 A2 | 4/2010 |
| WO | 2011038028 A2 | 3/2011 |
| WO | 2011087449 A1 | 7/2011 |
| WO | WO2012011076 A1 | 1/2012 |
| WO | WO2012032502 A1 | 3/2012 |
| WO | WO2012047158 A1 | 4/2012 |

OTHER PUBLICATIONS

Frederic Gabin; 3GPP Mobile Multimedia Streaming Standards; IEEE Signal Processing Magazine ( vol. 27, Issue: 6, Nov. 2010 ).*
Shih-Kai Lee; Fountain Codes With PAPR Constraint for Multicast Communications; IEEE Transactions on Broadcasting ( vol. 57, Issue: 2, Jun. 2011).*
Cyril Concolato, Romain Bouqueau; Usages of DASH for rich media services; MMSys '11 Proceedings of the second annual ACM conference on Multimedia systems pp. 265-270; Feb. 23-25, 2011.*
3rd Generation Partnership Project; 3GPP TS 26.237 V9.3.0 (Jun. 2010).*
Cyril Concolato, Jean Le Feuvre, Romain Bouqueau; Usages of DASH for Rich Media Services; MMSys'11, Feb. 23-25, 2011, San Jose, California, USA.*
Frédéric Gabin, Markus Kampmann,Thorsten Lohmar, and Clinton Priddle; 3GPP Mobile Multimedia Streaming Standards; IEEE Signal Processing Magazine [134] Nov. 2010.*
3GPP TS 26.346 "3rd Generation Partnership Project; Technical Specification Group Services and System Aspects; Multimedia Broadcast/Multicast Service (MBMS); Protocols and codecs," V10.0.0, Release Mar. 10, 2011.
International Search Report and Written Opinion—PCT/US2012/049228—ISA/EPO—Nov. 5, 2012.

(56) References Cited

OTHER PUBLICATIONS

"Open IPTV Forum a Release 2 Specification HTTP Adaptive Streaming Draft V0.04.01", 3GPP Draft; OIPF-DR-HAS-V0.04.01-2010-04-23, 3rd Generation Partnership Project (3GPP), Mobile Competence Centre; 650, Route Des Lucioles; F-06921 Sophia-Antipolis Cedex, France; vol. SA WG4, Vancouver, Canada; Apr. 26, 2010, Apr. 29, 2010 (Apr. 29, 2010), XP050437971, [retrieved on Apr. 29, 2010] Introduction, chapter 3.1.

Paila et al., "FLUTE—File Delivery over Unidirectional Transport", Network Working Group, RFC 3926, Oct. 1, 2004, The Internet Society, XP015009699, ISSN: 0000-0003.

Qualcomm Incorporated: "Initialisation Segment incorporation in DASH over MBMS", 3GPP Draft; S4-110622.ZIP:S4-110622 CR 26.346-0170 Initialisation Segment Incorporation in DASH Over MBMS (Release 10), 3rd Generation Partnership Project (3GPP), Mobile Competence Centre; 650, Route Des Lucioles ; F-06921 Sophia-Antipolis Cedex, France; vol. SA WG4, Meeting #65, Kista, Sweden; Aug. 15, 2011, Aug. 10, 2011 (Aug. 10, 2011), XP050552742, [retrieved on Aug. 10, 2011].

Translation of Japanese Office Action for Japanese Application No. 2014-524057 dated Feb. 3, 2015, 2 pages.

Huawei, "Survey and Gap Analysis for HTTP Streaming Standards and Implementations", IETF, draft-zong-httpstreaming-gap-analysis-01 (Oct. 24, 2010).

English language Translation of Notice to File a Response for Korean Application No. 2014-7005784 dated Aug. 11, 2015, 9 pages.

Translation of Russian Office Action dated Feb. 4, 2016 for Russian Application Serial No. 2014107894, 12 pages.

\* cited by examiner

METHOD AND APPARATUS FOR TRANSPORT OF DYNAMIC ADAPTIVE STREAMING OVER HTTP (DASH) INITIALIZATION SEGMENT DESCRIPTION FRAGMENTS AS USER SERVICE DESCRIPTION FRAGMENTS

CROSS-REFERENCE TO RELATED APPLICATION

This application claims the benefit of U.S. Provisional Application Ser. No. 61/513,992, entitled "METHOD AND APPARATUS FOR TRANSPORT OF DYNAMIC ADAPTIVE STREAMING OVER HTTP (DASH) INITIALIZATION SEGMENTS AS USER SERVICE DESCRIPTION FRAGMENTS" and filed on Aug. 1, 2011, which is expressly incorporated by reference herein in its entirety.

BACKGROUND

Field

The present disclosure relates generally to communication systems, and more particularly, to a method and apparatus for transport of Dynamic Adaptive Streaming over HTTP (DASH) initialization segments as user service description fragments.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus establishes a file delivery session with a server in a broadcast network for System Information (SI). Examples of SI defined for broadcast networks include the User Service Discovery/Announcement metadata defined in 3GPP Multimedia Broadcast/Multicast Service (MBMS), and the (Electronic) Service Guide or (E)SG specified by Open Mobile Alliance (OMA) Mobile Broadcast Services Enabler Suite (BCAST) standards. The apparatus also receives a plurality of data fragments in the file delivery session. The plurality of data fragments including at least one initialization segment description fragment, wherein the at least one initialization segment description fragment is associated with at least one media segment transmitted in another file delivery session. As used herein, the terms 'initialization data segment' and 'initialization segment' shall be considered synonymous.

In another aspect of the disclosure, a method, a computer program product, and an apparatus are provided. The apparatus transmits a first file delivery session in a broadcast network for delivering system information, the first file delivery session comprising a plurality of metadata fragments, the metadata fragments comprising at least one initialization segment description fragment associated with a user service. The apparatus also transmits a second file delivery session in the broadcast network for delivering media content associated with the user service.

DETAILED DESCRIPTION

Figure 1:
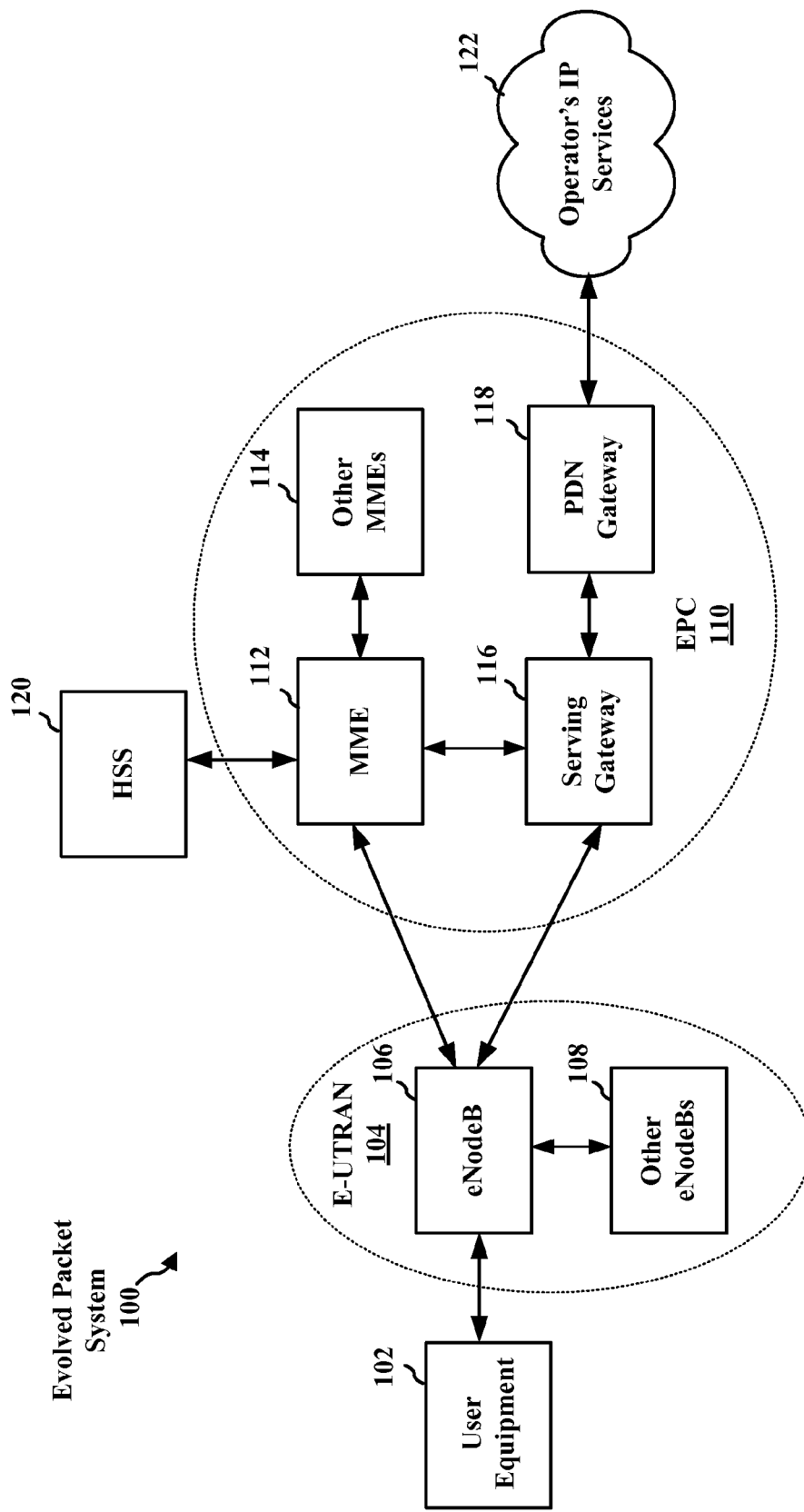
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
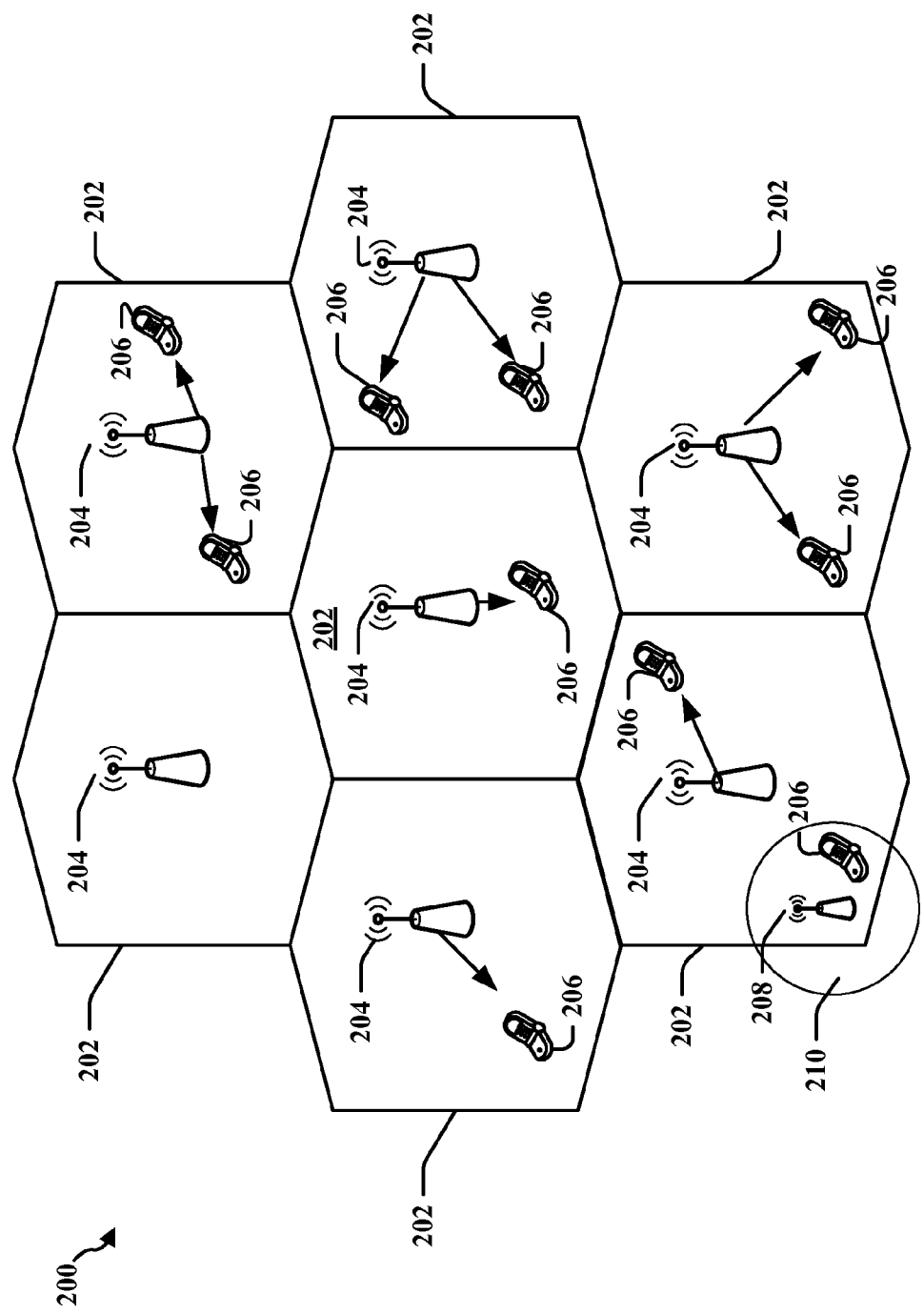
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both Frequency Division Duplex (FDD) and Time Division Duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
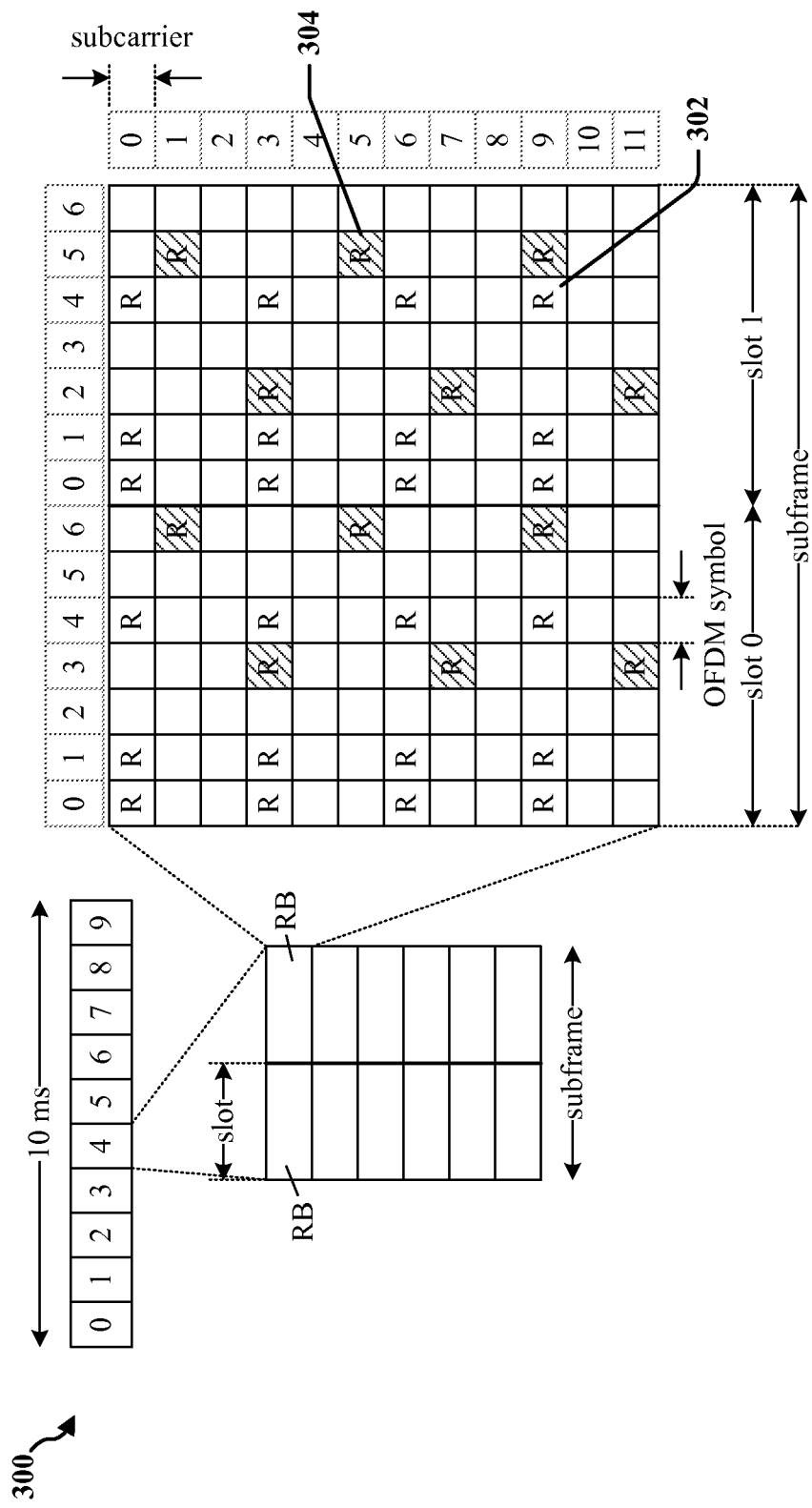
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
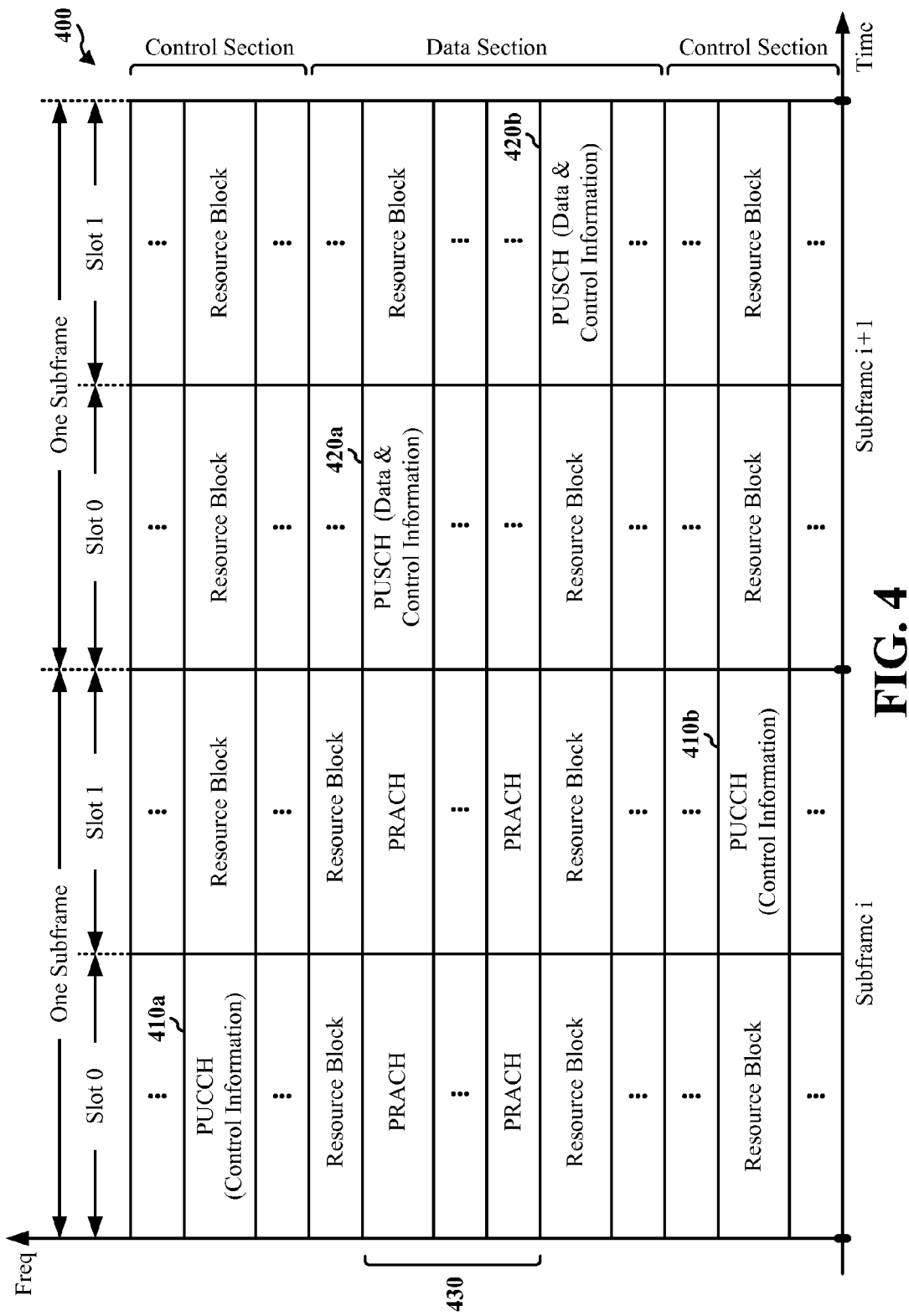
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
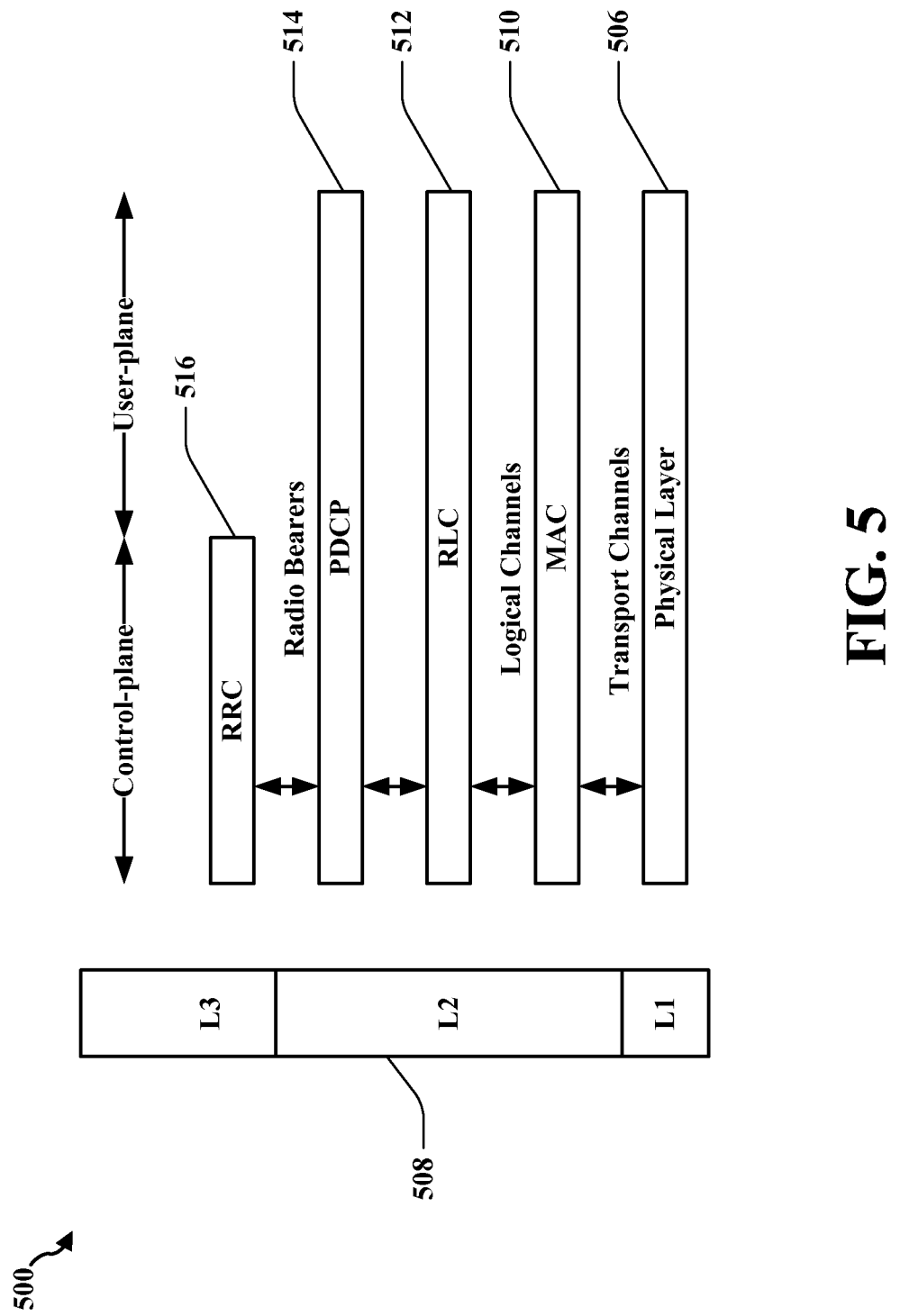
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
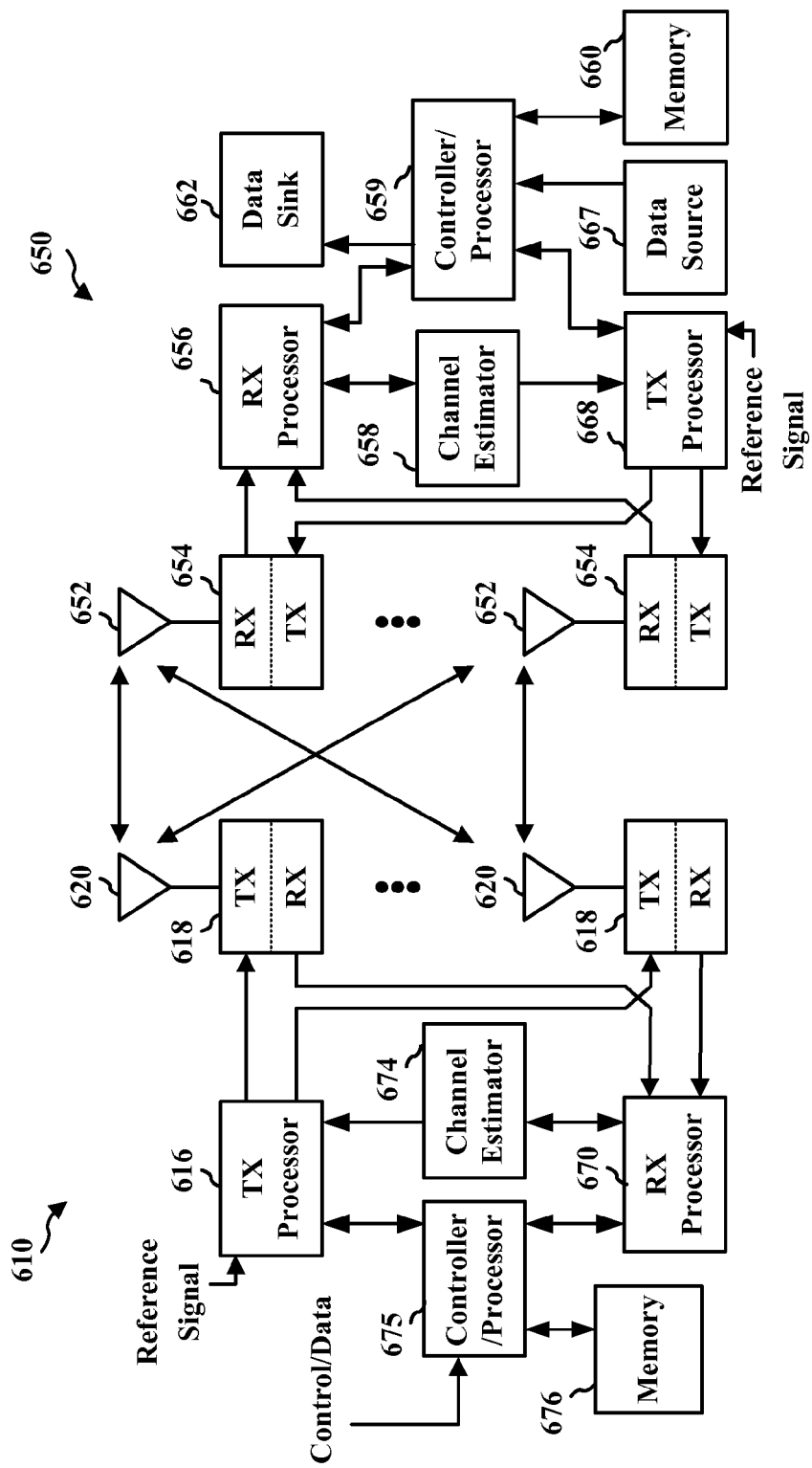
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
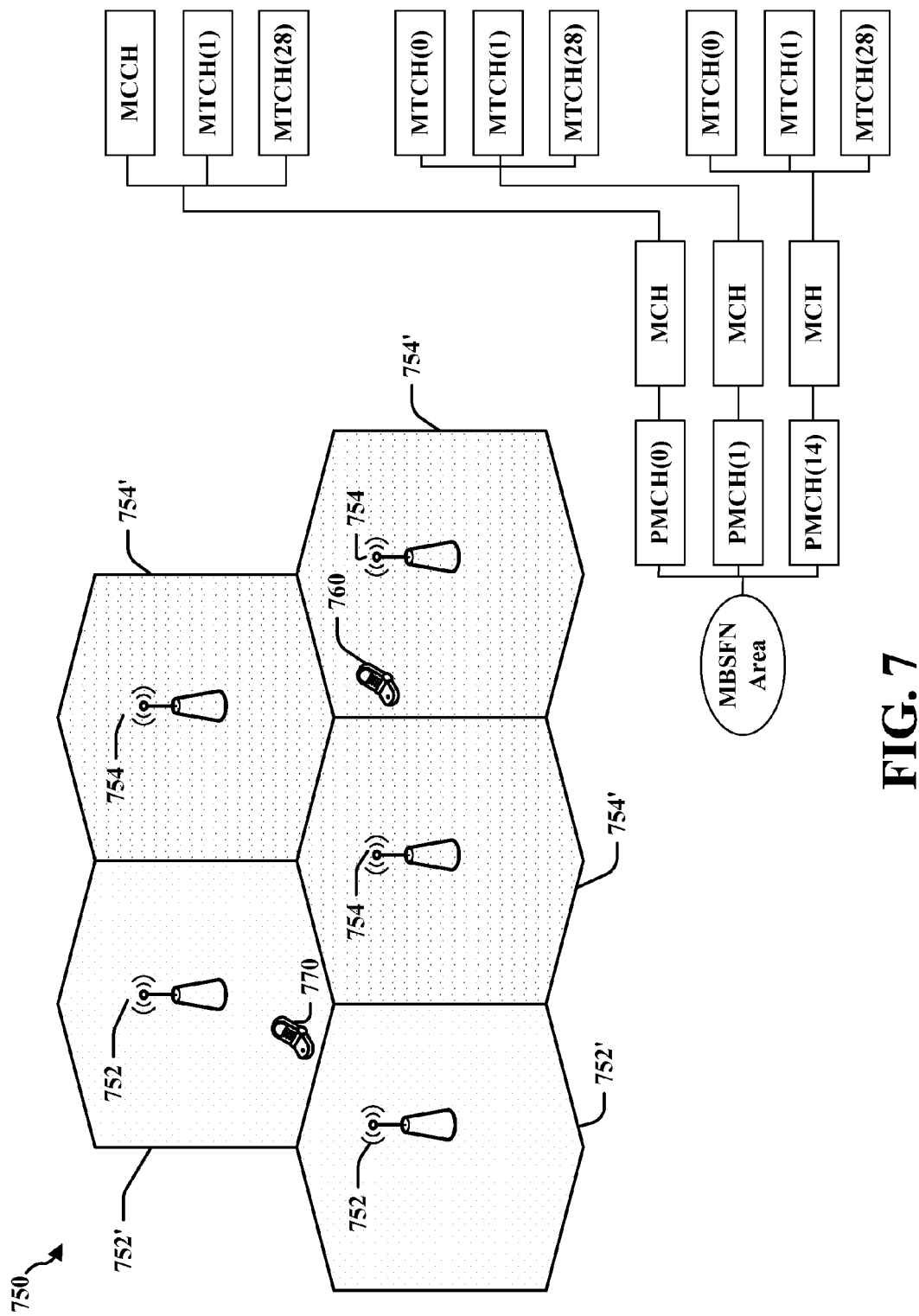
FIG. 7 is a diagram illustrating evolved MBMS (eMBMS) in a Multicast Broadcast Single Frequency Network (MB-SFN).

FIG. 7 is a diagram 750 illustrating evolved Multimedia Broadcast Multicast Service (eMBMS) in MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

In a multicast content delivery system, such as cellular or broadcast network based technologies such as 3GPP Multimedia Broadcast Multicast Service (MBMS), 3GPP2 Broadcast and Multicast Services (BCMCS), Digital Video Broadcasting-Handheld (DVB-H), Advanced Television Systems Committee-Mobile/Handheld (ATSC-M/H), etc., there is considerable interest in efficiently delivering service/content while decreasing latency. UMTS LTE allows for shared (multicast) types of services such as digital broadcast radio and digital video broadcast. The evolved MBMS (eMBMS) feature is provided with Multi-Media Broadcast over a Single Frequency Network (MBSFN) mode of operation and can simultaneously transmit the same media signals using UMTS LTE eNBs to multiple recipients in the same geographic region. By the nature of broadcast operation, as well as for efficient service provisioning, distribution of these services may occur over a large geographic area, for example broadcast by one or more transmitter sites covering a portion of, or an entire metropolitan area. As its name implies, eMBMS is an enhanced version of MBMS for LTE. eMBMS may be used to broadcast content such as digital TV to one or more user equipments located in a specified area which may be referred to herein as an MBMS service area. An MBMS service area typically includes multiple cells and/or eNBs. In MBSFN, the same data may be transmitted from multiple cells belonging to the MBMS service area with the same transport format using the same physical resources in a time synchronized manner. At the user equipment these transmissions may be treated as a multipath transmission from a single cell allowing these transmissions to be combined to improve signal strength and reduce interference. This technique may make transmission of LTE eMBMS services highly efficient and may provide additional diversity against fading on the radio channel. It should be noted that while the current system is eMBMS, it is by illustration and not limitation and the disclosed approach may be applied to other broadcast systems, including MBMS and other systems.

Services such as eMBMS may utilize the delivery of Dynamic Adaptive Streaming over HTTP (DASH) media segments to provide a streaming media service whereby DASH segments are delivered as individual files. For broadcast services, DASH transport may employ File Delivery over Unidirectional Transport (FLUTE) in place of HTTP. FLUTE is a protocol for unidirectional (e.g., as in broadcast) delivery of files for data delivery and utilizes a File Delivery Table (FDT) as a mechanism for signaling a set of file description entries for files to be delivered in the session. FDTs entries include files names, and mapping information between Uniform Resource Identifiers (URIs), also referred to as Content-Location, and Transport Object IDs (TOIs) to identify packets belonging to a given file. Also, Forward Error Correction (FEC) encoding may be applied to the files, whereby the FDT further describes what FEC scheme is used and FEC specific parameters. The FDT may include a set of file description entries for files to be delivered in a FLUTE session. Each file delivery session has an FDT that is local to the given session.

Figure 8:
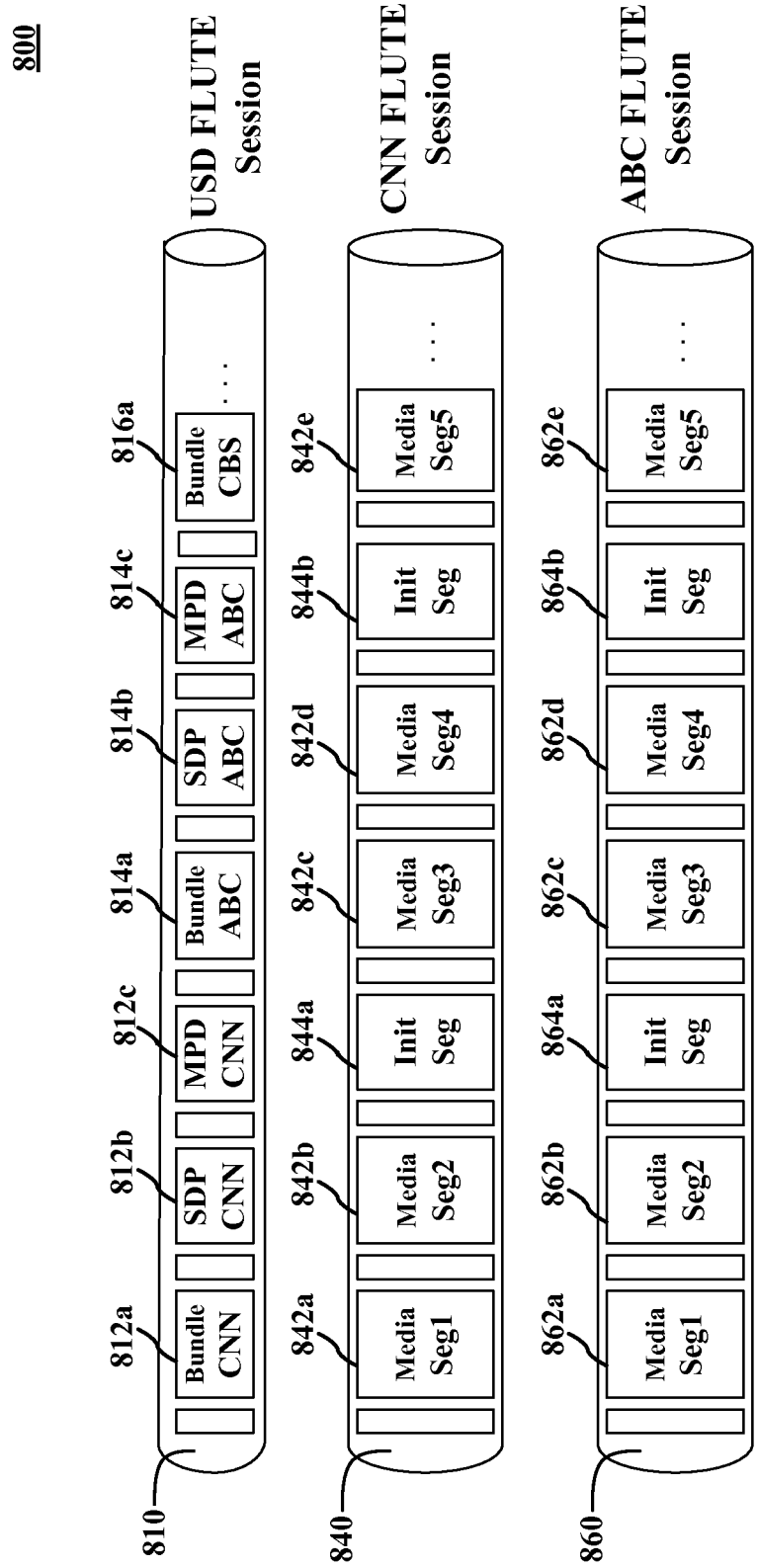
FIG. 8 is a diagram illustrating a current approach to delivering content for Dynamic Adaptive Streaming over HTTP (DASH) when SI metadata is distributed in an overhead service for User Service Description (USD) while DASH segments are delivered over dedicated services in MBMS over wireless networks.

FIG. 8, which is further described herein, depicts one approach to delivering broadcast content via DASH. Each user service (e.g., a TV channel such as CNN, ABC, CBS, ESPN) defined by the broadcast system may be transmitted over a FLUTE session which carries DASH segments corresponding to that user service. Additionally, a User Service Description (USD) FLUTE session may be transmitted to enable UE service discovery of the user services being broadcast. USD is the equivalent MBMS message definition for System Information (SI) that defines available services in an MBMS broadcast system. Other broadcast systems may define different formats for SI.

In MBMS, the USD metadata fragments may be transported in a FLUTE session, which includes: (1) a sequence of service bundle metadata fragments, which in turn reference a Session Description fragment (also referred to as an SDP fragment); and (2) a Media Presentation Description (MPD) fragment for each user service. Each service bundle fragment describes one or more services available in the MBMS system. The SDP fragment describes the transport protocol used to deliver media content for the user service. In one aspect of the disclosed system, the SDP fragment describes a FLUTE session when used for a user service that delivers DASH segments as the media content.

The MPD fragment associated with a MBMS user service provides information on the media segments and initialization segments carried in the FLUTE session for that particular user service. The FLUTE session information may be defined in the associated SDP fragment for that user service. Specifically, two types of data segments may be defined in the MPD: initialization segments and media segments. In the existing approach, a UE must acquire the initialization segments for DASH before the media segments may be processed because the initialization segments provide clients with metadata that describes the encoding of the media content, and may include other information such as the identity of DRM system associated with the protection of the media content belonging to the user service. As such, initialization segments are typically very small in size so that they may be quickly acquired to reduce start-up latencies as they are needed to play back the content contained in the media segments. For the broadcast DASH service, a FLUTE session is used to transmit both the initialization and media segments.

Figure 9:
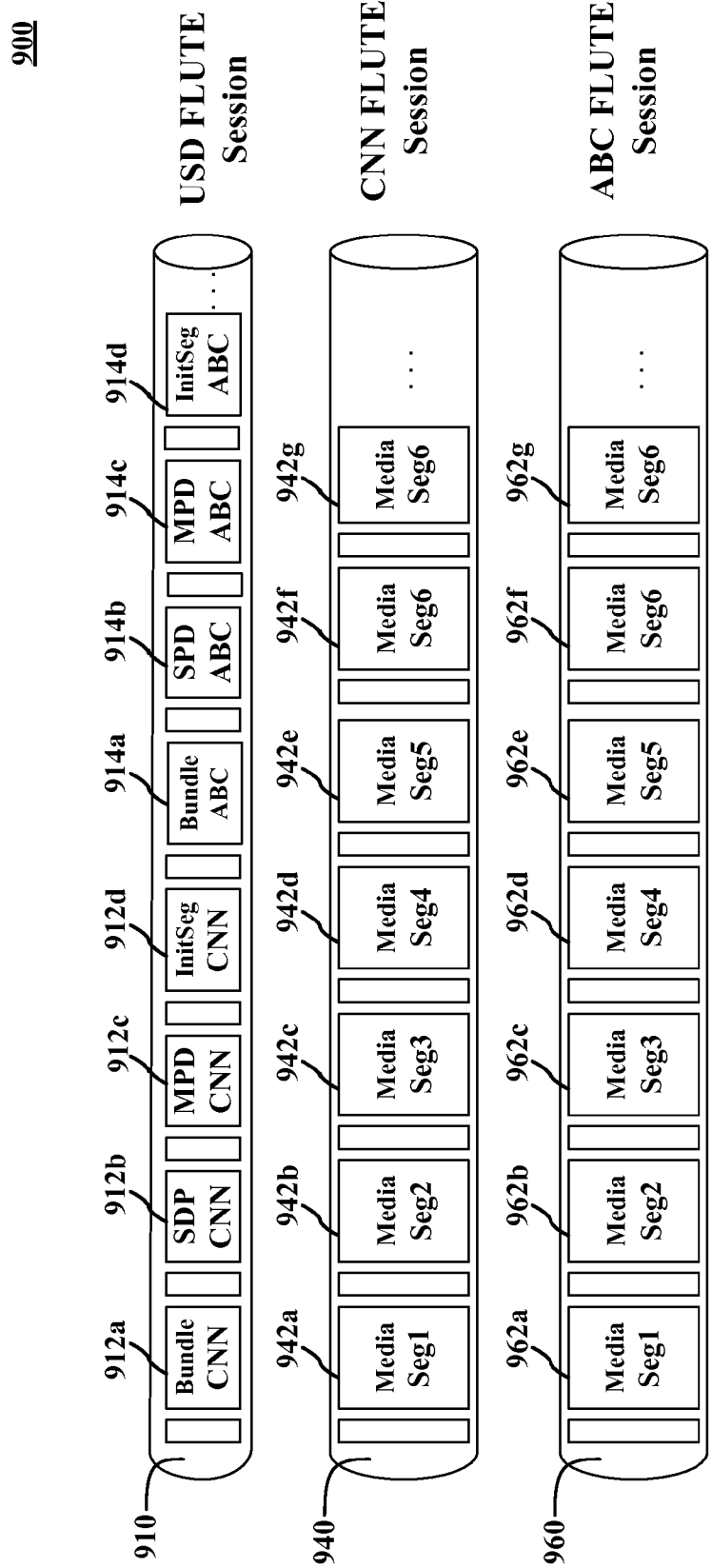
FIG. 9 is a diagram illustrating the transmission of SI information including the initialization segment, using a user services description transport in accordance with one exemplary approach described herein.

Potential issues with the above approach may include initial acquisition latency and service switching time. As a result, the UE might not be able to display the desired user service content in a timely fashion, which leads to reduced user satisfaction/enjoyment. An alternative approach to delivering DASH-formatted broadcast content via is depicted in FIG. 9. Here the initialization segments necessary to begin processing of the media content of the services may be carried as part of the USD FLUTE session. During the initial service discovery procedure, a UE may cache the initialization segment for each MBMS user service as well as the related bundle, SDP and MPD information. This may provide reduced latency when starting the MBMS service carried as DASH-encoded content, or when switching between DASH-encoded MBMS services. Initiation of content rendering on the UE no longer depends on reception of the initialization segment contained in the user service FLUTE session, e.g., the CNN FLUTE session, in the approach shown in FIG. 8.

In one aspect, the initialization segments may be sent in both the USD FLUTE session and the individual FLUTE sessions to enable backward compatibility with existing UEs. In another aspect, the initialization segments may not be sent in the individual FLUTE sessions to conserve system resources.

Figure 10:
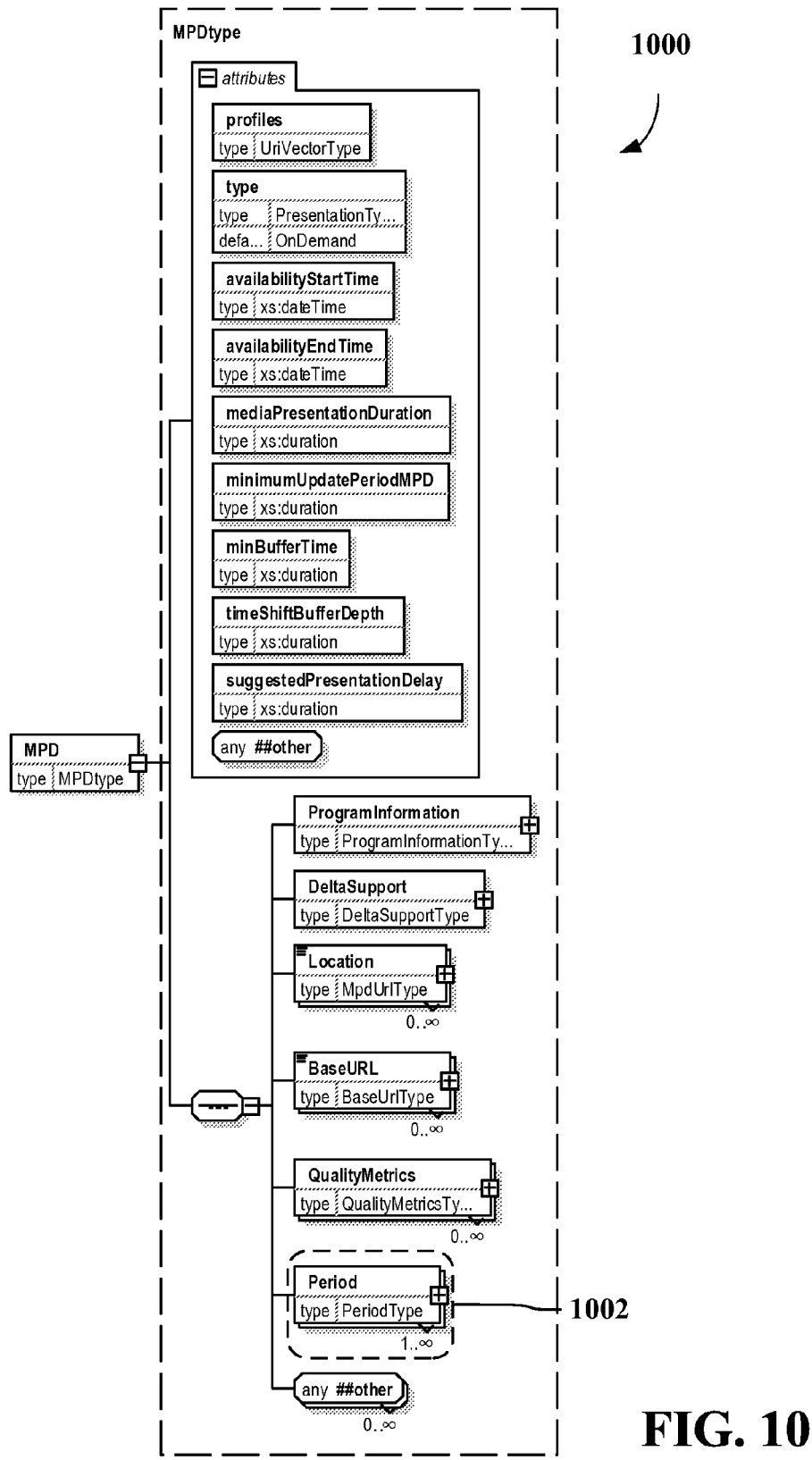
FIG. 10 is a diagram illustrating a high-level Extensible Markup Language (XML) schema structure for a Media Presentation Description (MPD) for Dynamic Adaptive Streaming over HTTP (DASH).
Figure 11:
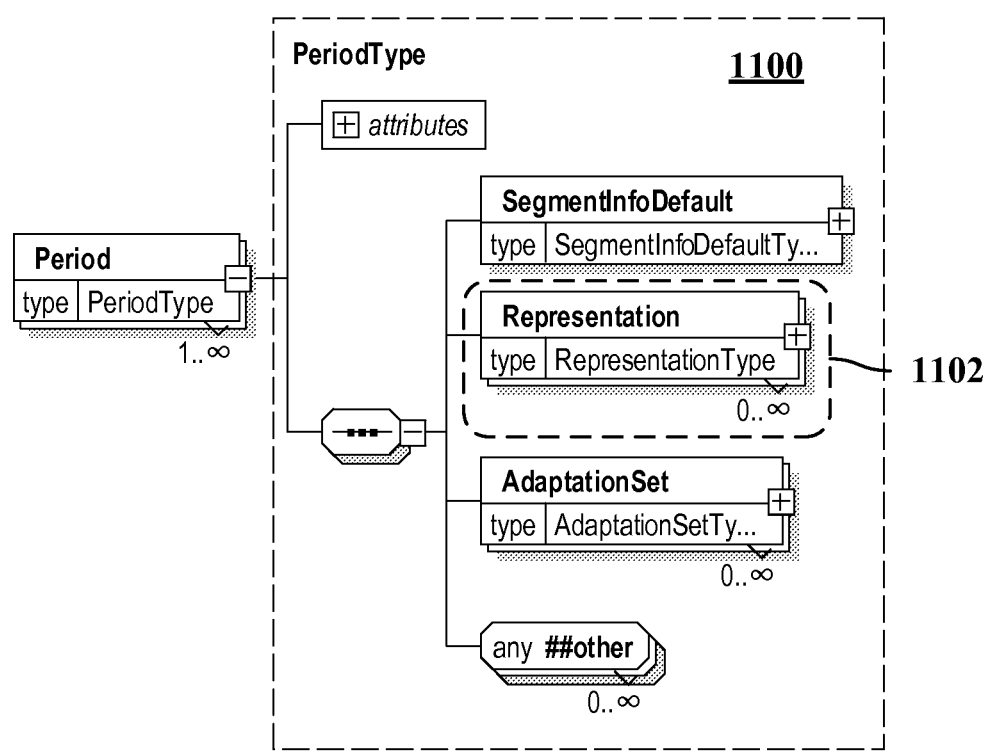
FIG. 11 is a diagram illustrating a high-level XML schema structure for periods in the MPD in FIG. 10.
Figure 12:
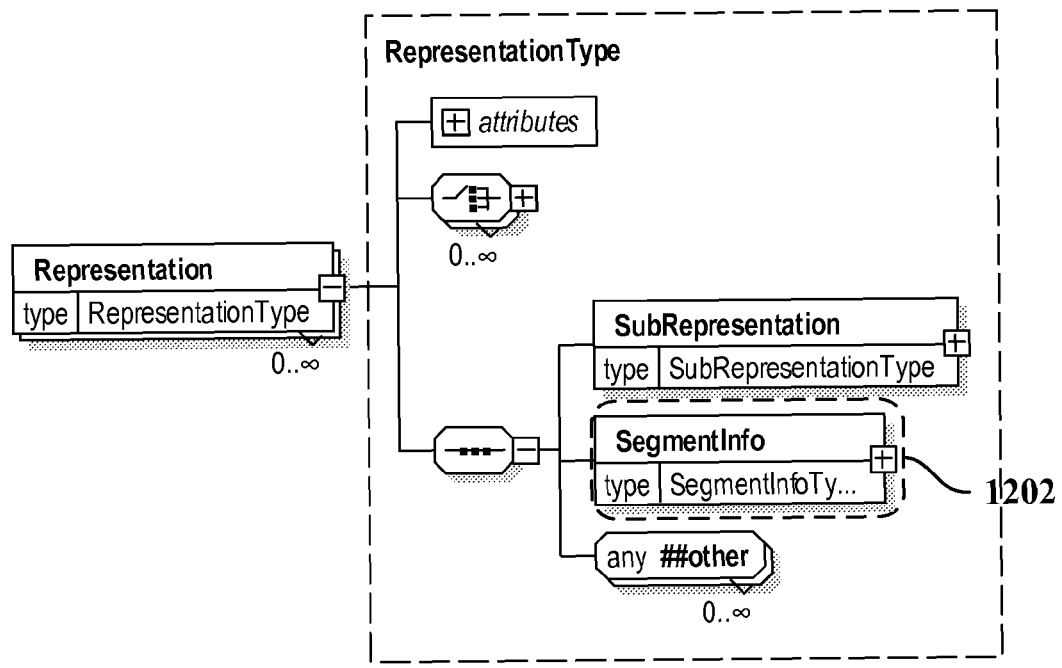
FIG. 12 is a diagram illustrating a high-level XML schema structure for representations on a period from the periods of FIG. 11.

FIG. 10 illustrates a high-level Extensible Markup Language (XML) schema structure 1000 for an MPD that includes at least one period 1002. FIG. 11 illustrates a high-level XML schema structure 1100 for the at least one period 1002 in the MPD of FIG. 10. The period structure 1100 may include multiple representations 1102. FIG. 12 illustrates a high-level XML schema structure 1200 for a representation from the period structure 1100. Each representation structure 1200 includes segment info 1202.

Figure 13:
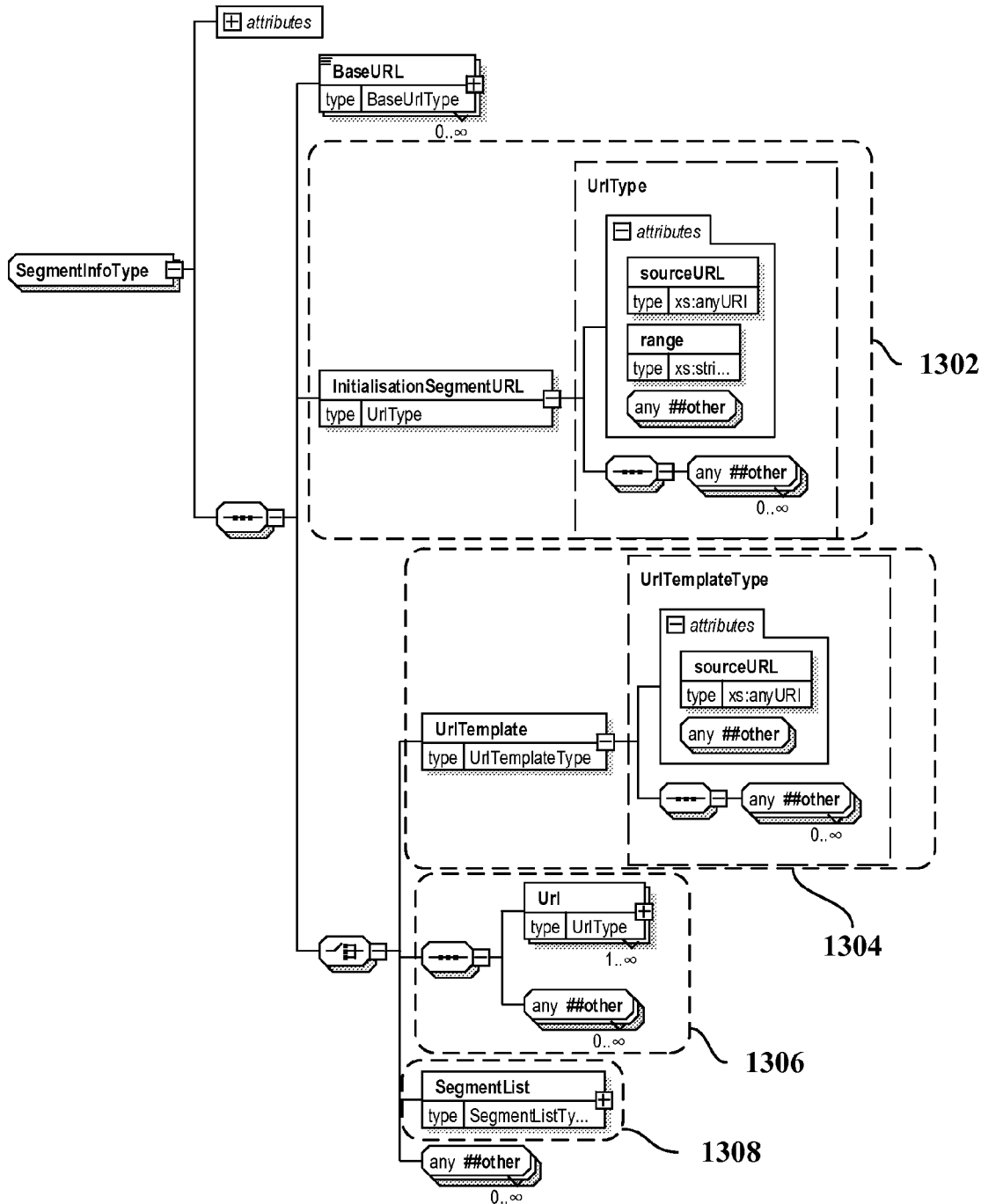
FIG. 13 is a diagram illustrating a high-level XML schema structure for segment information for a representation from the representations of FIG. 12.

FIG. 13 illustrates a high-level XML schema structure 1300 for segment info from the representation structure 1200. Two types of segments are referenced in the MPD via URLs: initialization segments 1302 and media segments. As FIG. 13 illustrates, media segments can be described via a UrlTemplate element 1304, a sequence of Url elements 1306, or a SegmentList element 1308. The initialization segments are either explicitly identified by InitializationSegmentURL or by the UrlTemplate of the index 0 (zero).

As an example, in the CNN service of FIG. 8, the URL for the initialization segment might be given by http://cnn.embms.com/InitSeg.3gp which represents the URL of the InitSig fragment in the USD FLUTE transport as illustrated in FIG. 9. Similarly, the media segment URLs might be of the form http://cnn.embms.com/MediaSeg$index$.3gp, where $index$ is replaced with a number, such that MediaSeg$index$ would be represented simply as MediaSeg# (e.g., MediaSeg3) in the FLUTE session for a user service carried as DASH content as illustrated in FIG. 9. The download delivery transport will report these URLs in the FDT for the respective FLUTE session and the files are sent as packets in the FLUTE sessions. FIG. 9 illustrates the time-sequential transmission of packets for each segment/file.

Figure 14:
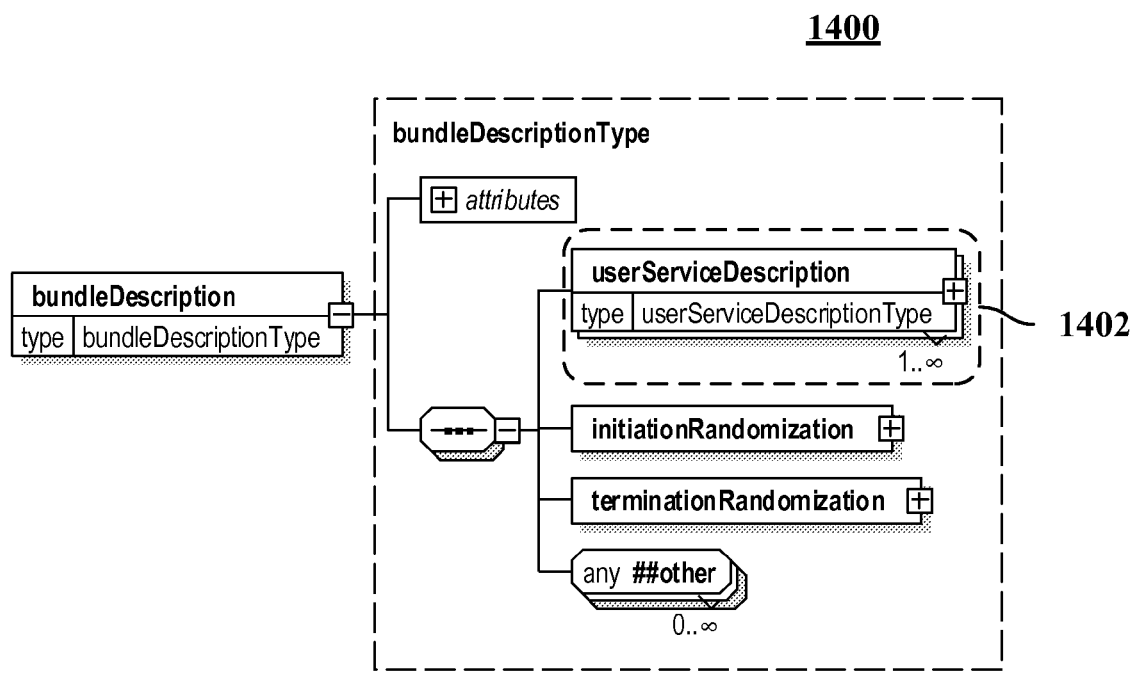
FIG. 14 is a diagram illustrating a metadata fragment for describing a service bundle, which is a form of SI defined for an MBMS over wireless networks.
Figure 15:
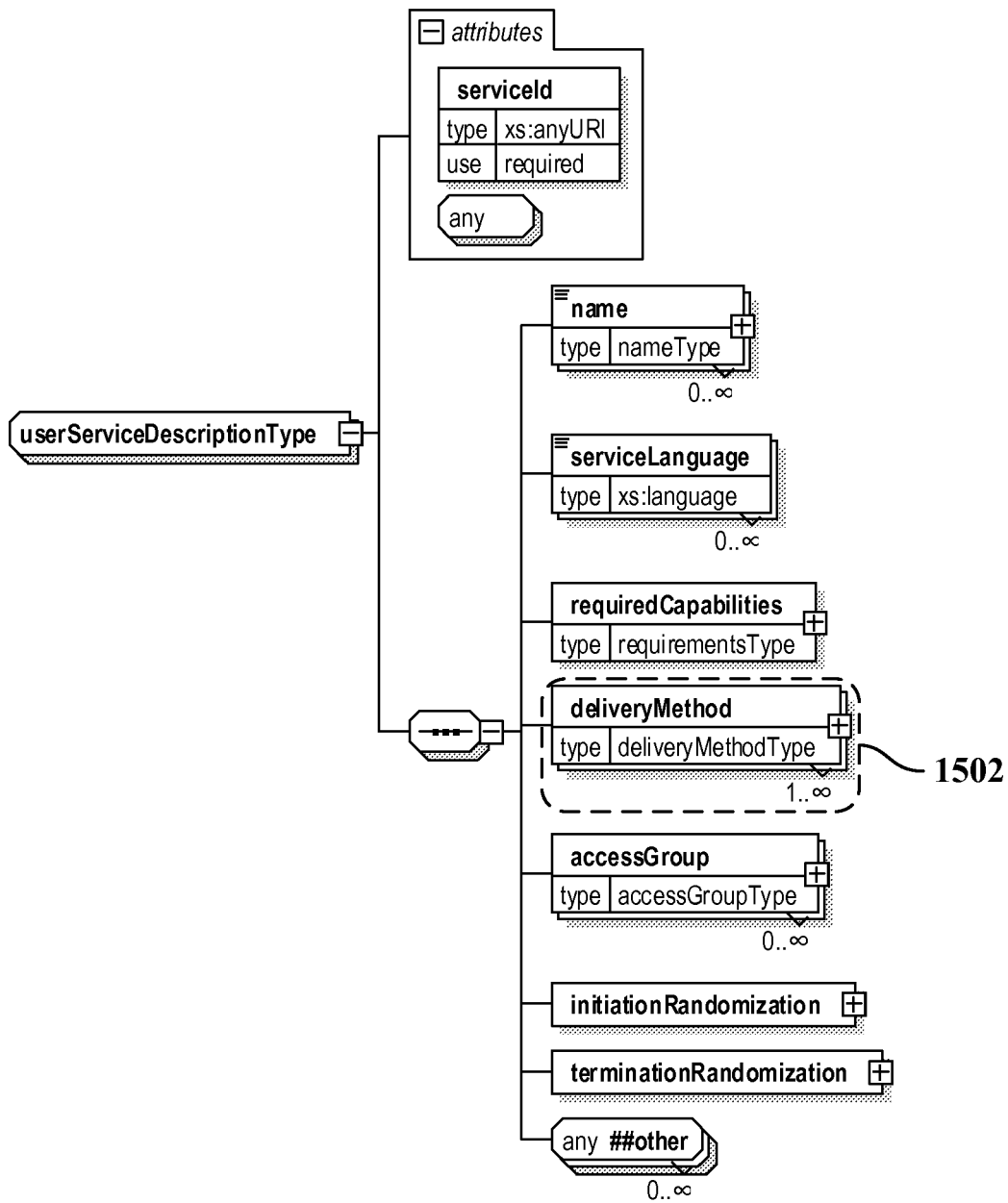
FIG. 15 is a diagram illustrating a metadata fragment for describing user service for a service bundle in the SI for MBMS over wireless networks.
Figure 16:
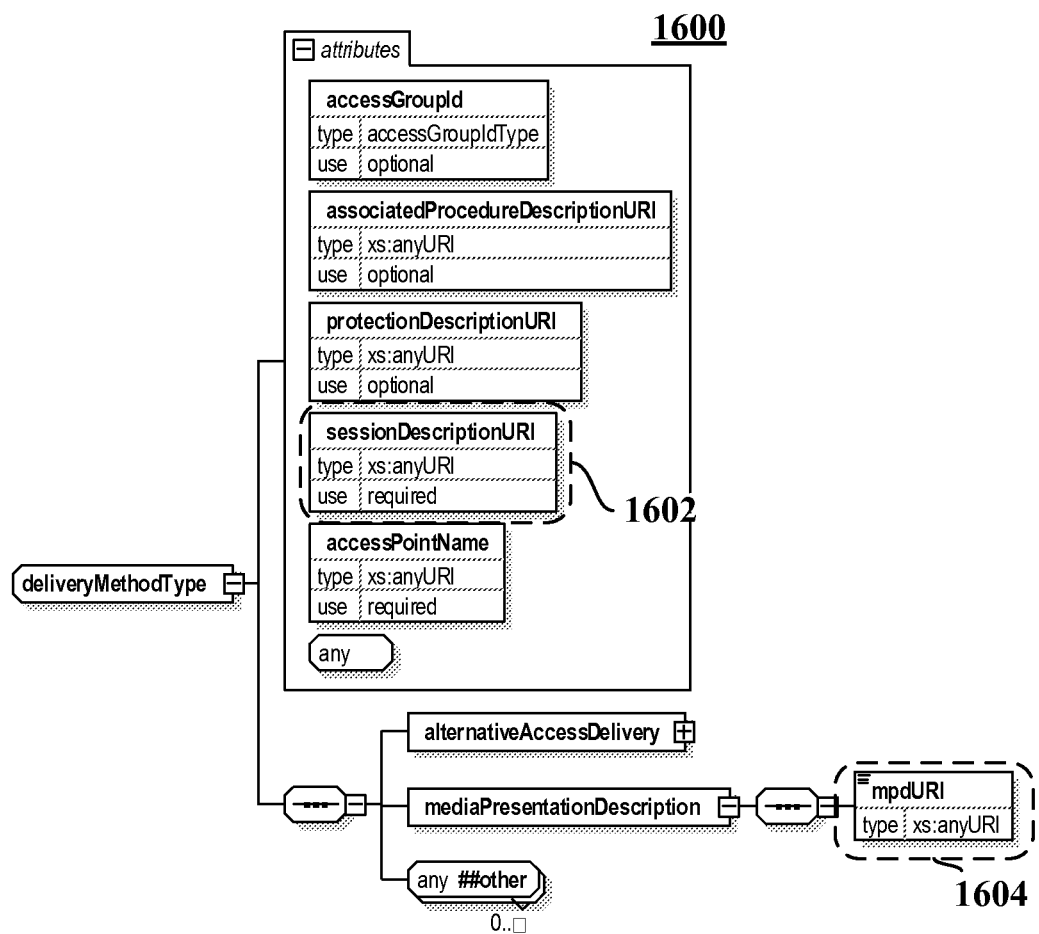
FIG. 16 is a diagram illustrating a metadata fragment for describing delivery methods for a user service in the SI for MBMS over wireless networks.

In eMBMS, user services may be described via metadata fragments in the format illustrated in FIGS. 14-16. FIG. 14 describes a format for a service bundle metadata fragment 1400 that includes at least one user service definition 1402 with parameters illustrated in FIG. 15 by the user service description element 1500. One set of such parameters may be a delivery method parameter 1502, as further illustrated by a delivery method metadata 1600 in FIG. 16. When user service information (e.g., USD) is broadcast over eMBMS, the bundleDescription metadata fragment 1400 and other metadata fragments (e.g., Session Description fragment) may be carried in a FLUTE session that includes the transport of USD metadata fragments, e.g., a FLUTE session dedicated solely to the transport of USD metadata fragments.

An eMBMS broadcast DASH service can be described by a delivery method type depicted in FIG. 16 with the following elements:

The sessionDescriptionURI element 1602 may point to an SDP file (transported as a metadata fragment) that describes a FLUTE session used for transport of DASH segments of a session.

The mpdURI element 1604 may indicate the URL for an MPD carried as a metadata fragment in the FLUTE session used to transport User Service Discovery metadata fragments.

Since a FLUTE session is defined for a broadcast DASH service, both initialization segments and media segments may be delivered on the same FLUTE session defined for the service, as illustrated in FIG. 8, where three different FLUTE sessions are illustrated. The FLUTE sessions may include a dedicated USD FLUTE session 810. The USD FLUTE session 810 carries descriptive information associated with the broadcast user service(s). The USD FLUTE session may be used by UEs during service discovery. As an example, the USD FLUTE session 810 includes, for a Cable News Network (CNN) broadcast: a CNN service bundle fragment 812*a*, a CNN Session Description (SDP) fragment 812*b*, and a CNN MPD fragment 812*c*; and for an American Broadcasting Company (ABC) broadcast session: an ABC service bundle fragment 814*a*, an ABC SDP fragment 814*b*, and an ABC MPD fragment 814*c*. A Columbia Broadcasting System (CBS) service bundle fragment 816*a* is also shown to illustrate the repetitiveness of the structure of the USD FLUTE session 810.

Continuing to refer to FIG. 8, a CNN FLUTE session 840 associated with the CNN service may include a plurality of media segments such as media segments 842*a*-842*e*, interspersed with initialization data in the form of initialization segments 844*a*, 844*b*. Similarly, an ABC FLUTE session 860 associated with the ABC service may include a plurality of media segments such as media segments 862*a*-862*e*, interspersed with initialization data in the form of initialization segments 864*a*, 864*b*.

To start receiving a file delivery session, the receiver needs to know the transport parameters associated with the session. The transport parameters of a session that the receiver may need to know include, for example, the source IP address, the number of channels in the session, the destination IP address and port number for each channel in the session, the Transport Session Identifier (TSI) of the session, an indication that the session is a FLUTE session, and whether de-multiplexing objects are needed. Optional parameters that may be used include: the start time and end time of the session, the Forward Error Coding (FEC) Encoding ID and FEC Instance ID when the default encoding is not used for FDT, and the content encoding format for the FDT. These parameters may be described according to a session description syntax contained in the Session Description fragment that is associated with the SDP protocol.

DASH segments transported in a FLUTE session structure exemplified in FIG. 8 may be a viable solution in some broadcast deployments, but such a structure may have the following drawbacks:

The initialization segment typically needs to be broadcast periodically and repeatedly to enable service start-up of new devices electing to receive a broadcast DASH service. The contents of the initialization segment can be updated over time (e.g. a different initialization segment may be sent corresponding to the playing of an advertisement in the program than that used to play the main program). Additionally, within the validity period of a given initialization segment instance, the initialization segment may be transmitted repeatedly, e.g., to ensure that the initialization segment is received by devices that power up at different times to receive the broadcast service.

Infrequent transmissions of initialization segments for bandwidth efficiency will however increase initial acquisition latency (for a device new to activating a DASH service) and channel switching delay (for a device that dynamically "changes channel" from one broadcast DASH service to another).

Frequent transmissions of initialization segments will reduce start-up and channel switching latency, but at the expense of consuming greater transmission resources (bandwidth) for the transport of this overhead information.

Initial acquisition latency for a broadcast DASH service and channel switching latency may be important parameters in determining the quality of the user experience in viewing the broadcast sessions. In order to reduce startup latency and/or enhance perceived performance in channel switching time between different content channels, the system described herein provides for initialization segments for broadcast DASH services in eMBMS to be transported in a FLUTE session different than the one used to transport media segments. This FLUTE session might be the dedicated USD FLUTE session, or perhaps another FLUTE session known to the UE.

Figure 17:
FIG. 17 is a diagram illustrating a file delivery table packet.

FIG. 17 is a diagram 1700 illustrating an FDT packet carrying an FDT instance. The FDT packet includes a User Datagram Protocol (UDP) header 1702, a default layered coding transport (LCT) header 1704, LCT header extensions 1706, a forward error correction (FEC) payload identifier 1708, and the FLUTE payload 1710, which includes the FDT instance.

FIGS. 10-17 illustrate various aspects of data, hardware and network architectures for implementing the broadcasting of DASH initialization segments described herein. These should be taken as examples and not limiting to the various ways that the system may be implemented.

As discussed herein, delivery of broadcast services data may be via the FLUTE protocol. The FLUTE protocol may support delivery of files over IP multicast, and may be specified for download delivery of file content in various cellular and downlink-only broadcast systems specifications. These may include MBMS, BCMCS, DVB-H, and Open Mobile Alliance (OMA) Mobile Broadcast Services Enabler Suite (BCAST). While exemplary embodiments are discussed within FLUTE specifically, the exemplary embodiments may also apply to Asynchronous Layered Coding (ALC).

The FLUTE protocol is a specific transport application of ALC. The FLUTE protocol adds the following functionalities: (1) definition of file delivery session built on the ALC object delivery session framework, (2) in-band signaling of transport parameters of the ALC session, (3) in-band signaling of the attributes and source locations of delivered files, and (4) detailed relationships among multiple files for combined delivery within a session. Within (3), the FDT instance is extended to include the target area and other associated parameters, as discussed above. File attributes may be transmitted in FLUTE by the definition of the FDT, each instance of which provides a set of descriptors of the broadcast files being delivered, such as each of the broadcast file's identifier, size, content encoding method, etc.

In one aspect of the system disclosed herein, the initialization segments for broadcast DASH services in eMBMS will be transported in a FLUTE session different than the one used to transport media segments. This could be the same FLUTE session used to transport USD information or yet another FLUTE session known to the device. When the initialization segments for a session are transported by another FLUTE session, the UE may be signaled to indicate where the initialization segments may be found. The signaling may be achieved by assuming that the URLs as specified in MPD for the initialization segment, as illustrated in FIG. 13, is equivalent to the URLs for the initialization segment fragment and that they are carried in the FLUTE session for the USD. With no further information available, this signals that the initialization segments for a service are not carried in the FLUTE session defined for the service, but rather in another FLUTE session known to the device, e.g., the FLUTE session for USD fragments.

Referring back to FIG. 9, illustrated are three different FLUTE sessions defined in an MBMS system, including a USD FLUTE session 910. The USD FLUTE session 910 includes information for the broadcast content that may be used during UE service discovery. As an example, the USD FLUTE session 910 may include, for a CNN broadcast session: a CNN bundle 912*a*, a CNN SDP 912*b*, and a CNN MPD 912*c*; and for an ABC broadcast session: an ABC bundle 914*a*, an ABC SDP 914*b*, and an ABC MPD 914*c*. Interspersed in the USD FLUTE session 910 are initialization segments such as initialization segments 912*d*, 914*d* for CNN and ABC services, respectively. Continuing to refer to FIG. 9, the other FLUTE sessions are dedicated to the transport of media segments for the services. For example, a CNN FLUTE session 940 associated with the CNN service includes a plurality of media segments such as media segments 942*a*-942*g*. Similarly, an ABC FLUTE session 960 associated with the ABC service includes a plurality of media segments such as media segments 962*a*-962*g*.

Alternatively, it may be desirable to signal when the initialization segment is carried on a FLUTE session other than the FLUTE session defined for the service. In one aspect, this can be achieved by including references to the initialization segments in the delivery method for the broadcast DASH service as illustrated by a reference 1802 in the data fragment 1800 in FIG. 18. For example, a URL similar to the URL illustrated in the MPD of FIG. 13 may be used to signal the location of the initialization segment. This could be a way to explicitly signal whether the initialization segments for the DASH service are carried in the FLUTE session defined for the service. If the URLs in the delivery method for the service are included, the presence of such URLs signals that the initialization segments for a service are not carried in the FLUTE session defined for the service, but rather in another FLUTE session known to the device, e.g., the FLUTE session for USD fragments. However, the absence of the URLs in the delivery method for the service signals that the initialization segments for a service are carried in the FLUTE session defined for the service, which may be of interest if the initial acquisition to the DASH service and channel switching are not a concern.

Figure 18:
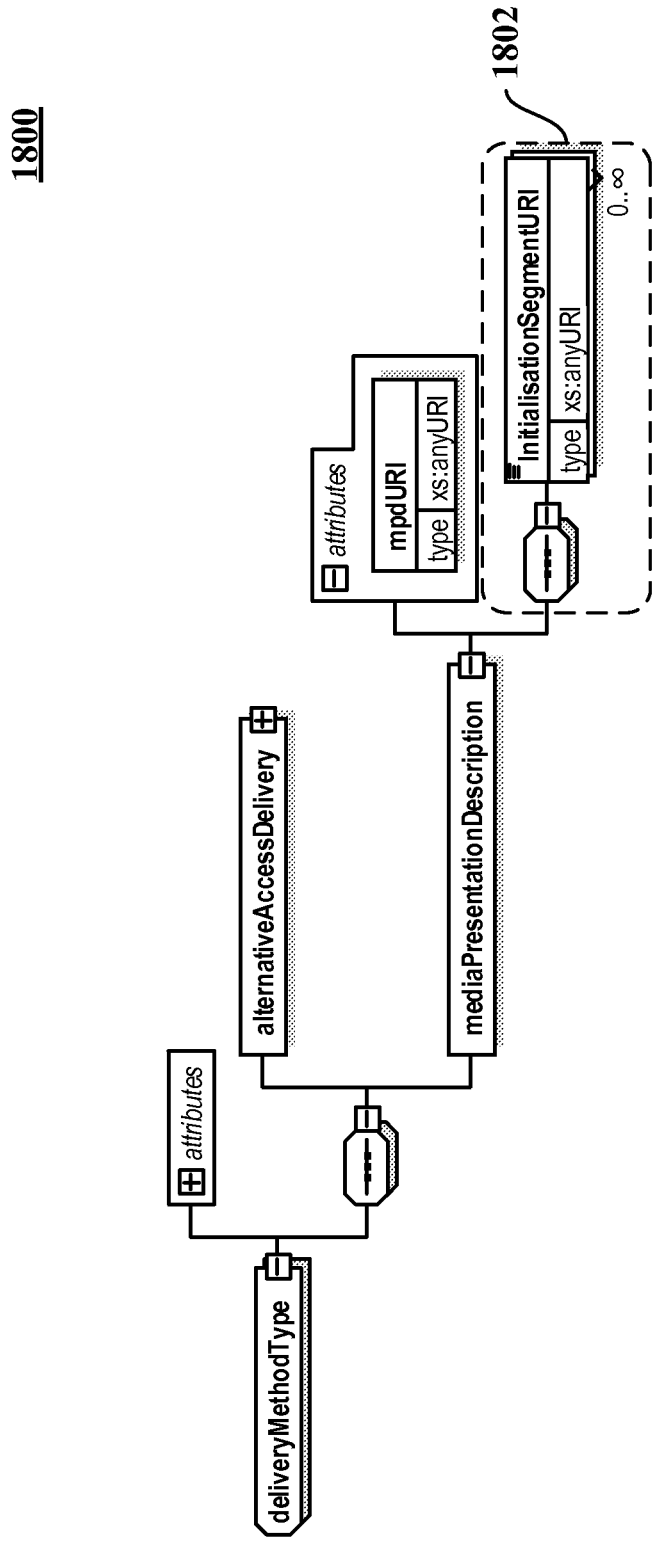
FIG. 18 is a diagram illustrating signaling initialization segment transport in USD for another exemplary approach.
Figure 19:
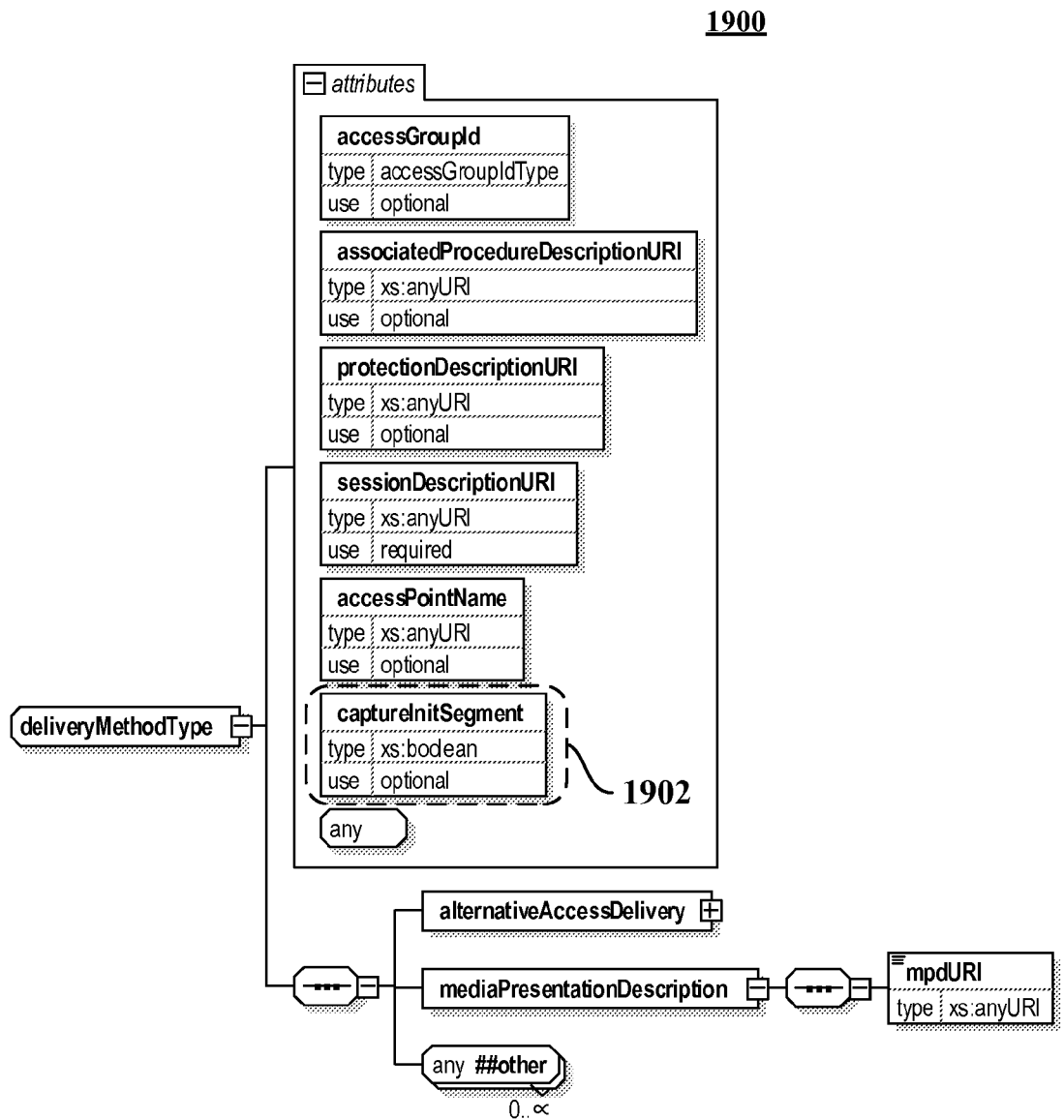
FIG. 19 is a diagram illustrating signaling initialization segment transport in USD for yet another exemplary approach.

In another aspect, URLs pointing to the initialization segments in FIG. 18 need not match those in the corresponding MPD for the service, transport of initialization segments on a FLUTE session other than the FLUTE session defined for the service. A captureInitSegment attribute 1902 may be added in the delivery method element 1900 for the broadcast DASH service as illustrated in FIG. 19; the captureInitSegment attribute 1902 indicates that the initialization segment URLs in the included MPD will be delivered over a FLUTE session other than the FLUTE session defined for the service. With this approach, whether or not the initialization segments for the DASH service are carried in the FLUTE session defined for the service, may be explicitly signaled. The captureInitSegment in the delivery method for the service may be set to True to signal that the initialization segments for a service are not carried in the FLUTE session defined for the service, but rather in another FLUTE session known to the device, e.g., the FLUTE session for USD fragments. The URLs for the initialization segments are those defined in the MPD for the service. CaptureInitSegment in the delivery method for the service may be set to False to signal that the initialization segments for a service are carried in the FLUTE session defined for the service.

Alternatively, without explicit signaling of whether or not the initialization segments are carried on the FLUTE session for the service, the additional information 1802 in the data fragment 1800 in FIG. 18 may not be needed. In this manner, the UE may initially assume that the initialization segment will be found in the same FLUTE sessions used for the USD fragments, e.g., as illustrated in FIG. 9. Thereafter, if the initialization segment is determined not to be available in the same FLUTE session used for the USD fragments, the UE can find the initialization segment in the same FLUTE session used for the service segments as in FIG. 8. For example, if a determination is made the initialization segment is not included in the FLUTE session for USD fragments, the UE may receive the initialization segment in a FLUTE session used for service segments.

Figure 20:
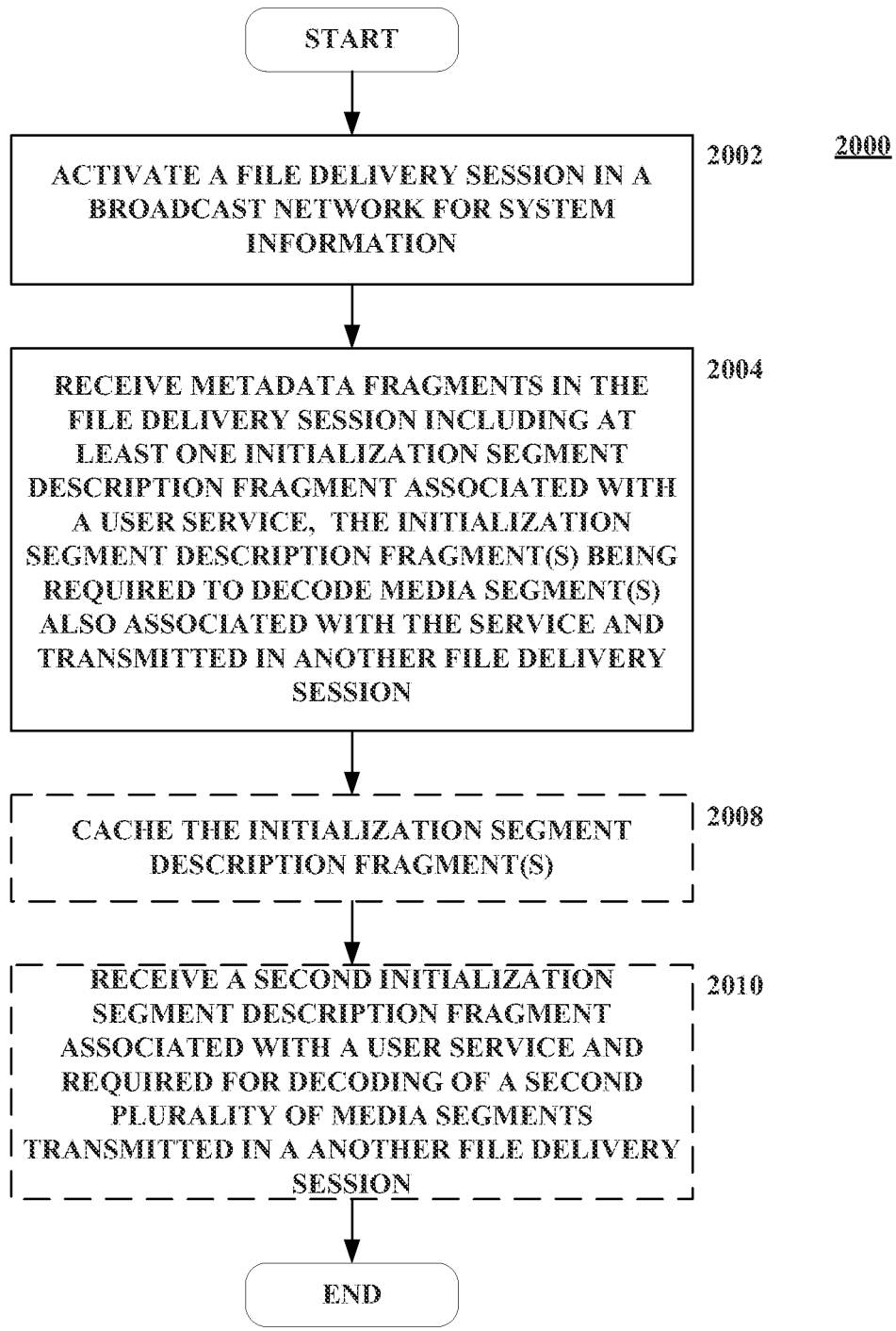
FIG. 20 is a flow chart of a process for reception of initialization segments in accordance with an exemplary approach.

FIG. 20 is a flow diagram 2000 of wireless communication including the reception of initialization segment description fragments. The method may be performed by a wireless device, such as the UE 102. At step 2002, the UE activates a file delivery session (e.g., a FLUTE session) defined in an eMBMS network for the transport of USD. The UE activates the session by beginning to download content on the defined network address and port associated with the transport session ID of the file delivery session. Thus, the UE will activate a file delivery session in a broadcast network for system information.

At step 2004, the UE receives a plurality of metadata fragments in the file delivery session comprising at least one initialization segment description fragment. The file delivery session may be the same file delivery session as the USD file delivery session or may be another file delivery session. The at least one initialization segment description fragment may be associated with a user service and may be required to decode at least one media segment also associated with the service but transmitted in the other file delivery session. The initialization segment description fragment may include, e.g., information necessary to playback the at least one media segment. The file delivery session, e.g., FLUTE session, may include a sequence of service bundle metadata fragments that each reference a session description protocol and a media presentation description fragment for a plurality of user services in addition to the initialization segment description fragment. The broadcast network may include an eMBMS network for a broadcast DASH service.

The initialization segment description fragment may be referenced in an MPD, e.g., the MPD may include a plurality of URIs representing an identity and a network location of at least one of an initialization segment or a media segment. The URIs may include at least one URL.

When the file delivery session carrying the initialization segment is separate than the FLUTE session carrying the USD, the USD data fragment may include a delivery method data parameter that indicates that the at least one initialization data segment is carried in a different file delivery session, e.g., the user service file delivery session, which is also the file delivery session for carrying the corresponding media segments for the user service. For example, the delivery method data parameter may include a URI for the initialization data segment, or the delivery method data parameter may include an attribute that indicates the at least one initialization data segment is carried in the user service file delivery session that carries the corresponding media segments when the at least one attribute is set to a predetermined value.

Alternately, the file delivery session may include an attribute that indicates that the initialization segment description fragment is carried in the file delivery session, which includes the USD. The initialization segment description fragment may be carried in the file delivery session for system information by convention.

At step 2008, the UE may optionally cache the at least one initialization segment description fragment. Optional aspects are illustrated using a dashed line.

At step 2010, the UE may also optionally receive a second initialization segment description fragment associated with the user service and required to decode at least one second media segment. This may include the activation of a second file delivery session in the broadcast network for broadcast delivery of a user service including DASH formatted media content. Thereafter, the at least one second media segment transmitted in the second file delivery session, and the at least one media segment may be decoded using the cached initialization segment description fragment.

In order to enable backward compatibility with existing UEs, the initialization segments may be sent both in a file delivery session interspersed with media segments and initialization segment description fragments may be sent in a separate file delivery session. Thus, the UE may further receive at least one initialization data segment interspersed in the same file delivery session as the at least one media segment. UEs that are capable of receiving the initialization segment description fragment in a separate file delivery session different from the file delivery session for the media segments will be able to obtain the initialization segment description fragment separately from the media segments. Other UEs, e.g., legacy UEs, may obtain and use the initialization segments that are sent in the same file delivery session as the media segments.

The method may more efficiently deliver service and content while decreasing latency to provide a better user experience.

Figure 21:
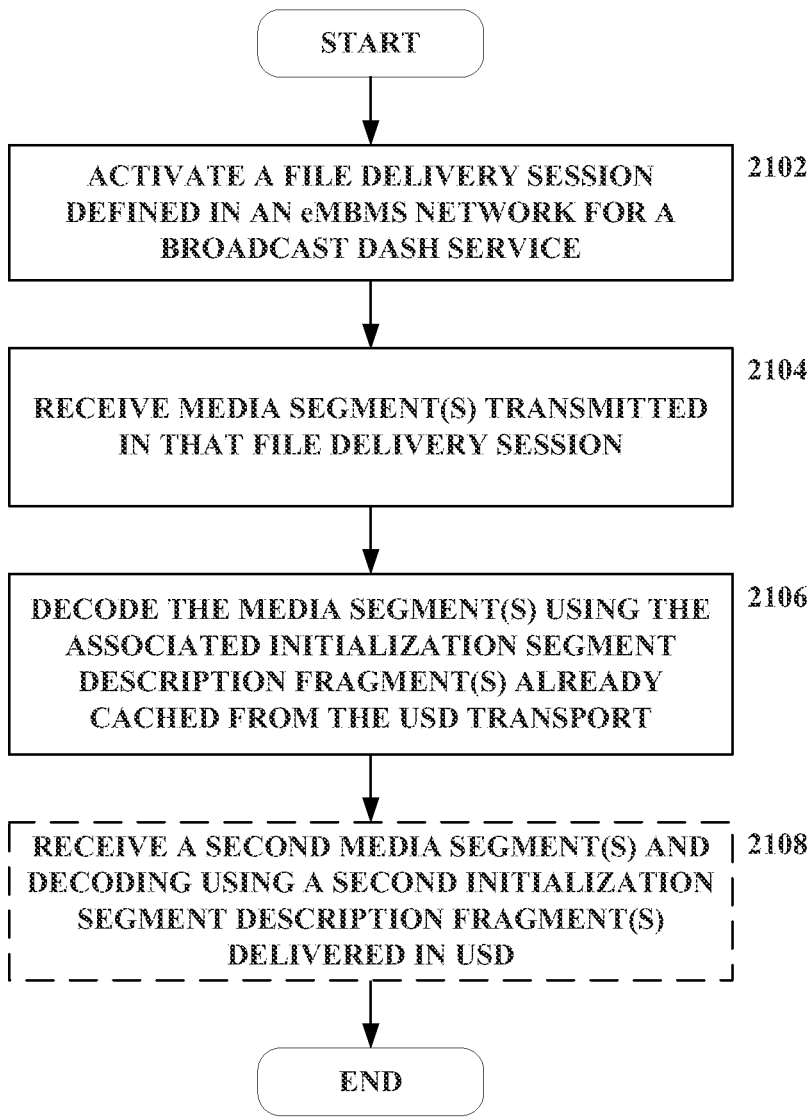
FIG. 21 is a flow chart of a process for reception of media segments in accordance with an exemplary approach.

FIG. 21 is a flow chart 2100 of wireless communication including the reception of media segments. The method may be performed by a wireless device, such as UE 102. The method of flow chart 2100 may be performed in combination with aspects of flow chart 2000.

At step 2102, the UE activates a file delivery session defined in an eMBMS network for a broadcast DASH service. The UE begins to download content on a defined network address and port associated with a transport session ID of the file delivery session.

At step 2104, the UE receives at least one media segment transmitted in that file delivery session.

At step 2106, the UE may decode the at least one media segment using an associated initialization segment description fragment delivered in a file delivery session for system information that is different than a file delivery session for the user service. This file delivery session for system information may be the file delivery session for the USD, or may be a separate file delivery session from the FLUTE session carrying the USD. For example, the associated initialization segment description fragment may be the initialization data segment cached in step 2008 of flow chart 2000.

At step 2108, the UE may also optionally receive and decode at least one second media segment associated with a second initialization segment description fragment delivered via the file delivery session for the USD. For example, the second initialization segment description fragment may include the second initialization segment description fragment received at step 2010.

Figure 22:
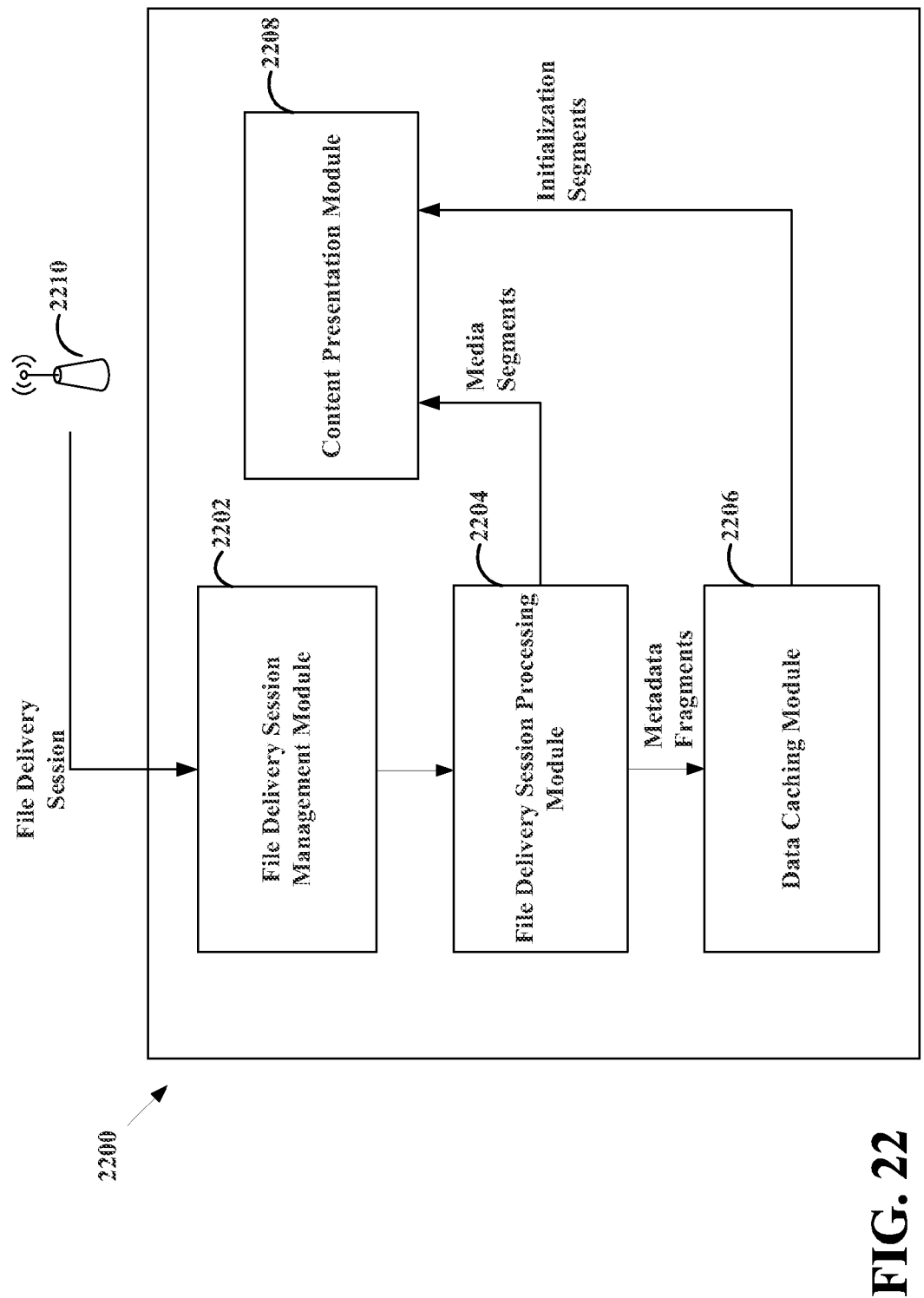
FIG. 22 is a conceptual block diagram illustrating the functionality of an exemplary apparatus for receiving and processing initialization and media segments.

FIG. 22 illustrates a conceptual data flow diagram illustrating the data flow between different modules/means/components in an exemplary apparatus 2200. The apparatus may be a UE. The apparatus 2200 includes a file delivery session management module 2202 that is configured to activate a file delivery session in a broadcast network for system information. The apparatus 2200 further includes a file delivery session processing module 2204 that is configured to receive a plurality of files (metadata fragments if the session is used for User Service Discovery, or DASH segments if the session is used to deliver DASH streaming content) in the file delivery session from a network 2210. For a USD transport, the plurality of metadata fragments include at least one initialization segment description fragment, wherein the at least one initialization segment description fragment is associated with a user service and with at least one media segment transmitted in another file delivery session. The apparatus 2200 further includes a data caching module 2206 that is configured to cache the at least one initialization segment description fragment. For a media segment transport, the at least one media segment associated with an initialization segment description fragment delivered in the USD is received via a separate file delivery session. The apparatus 2200 further includes a content processing module 2208 that is used to decode media segments for playback while also using the cached initialization segments. The file delivery session processing module 2204 may be further configured to receive a second initialization data segment associated with the user service and at least one second media segment. As such, each step in the aforementioned flow chart of FIGS. 20 and 21 may be performed by a module and the apparatus 2200 may include one or more of those modules.

Figure 23:
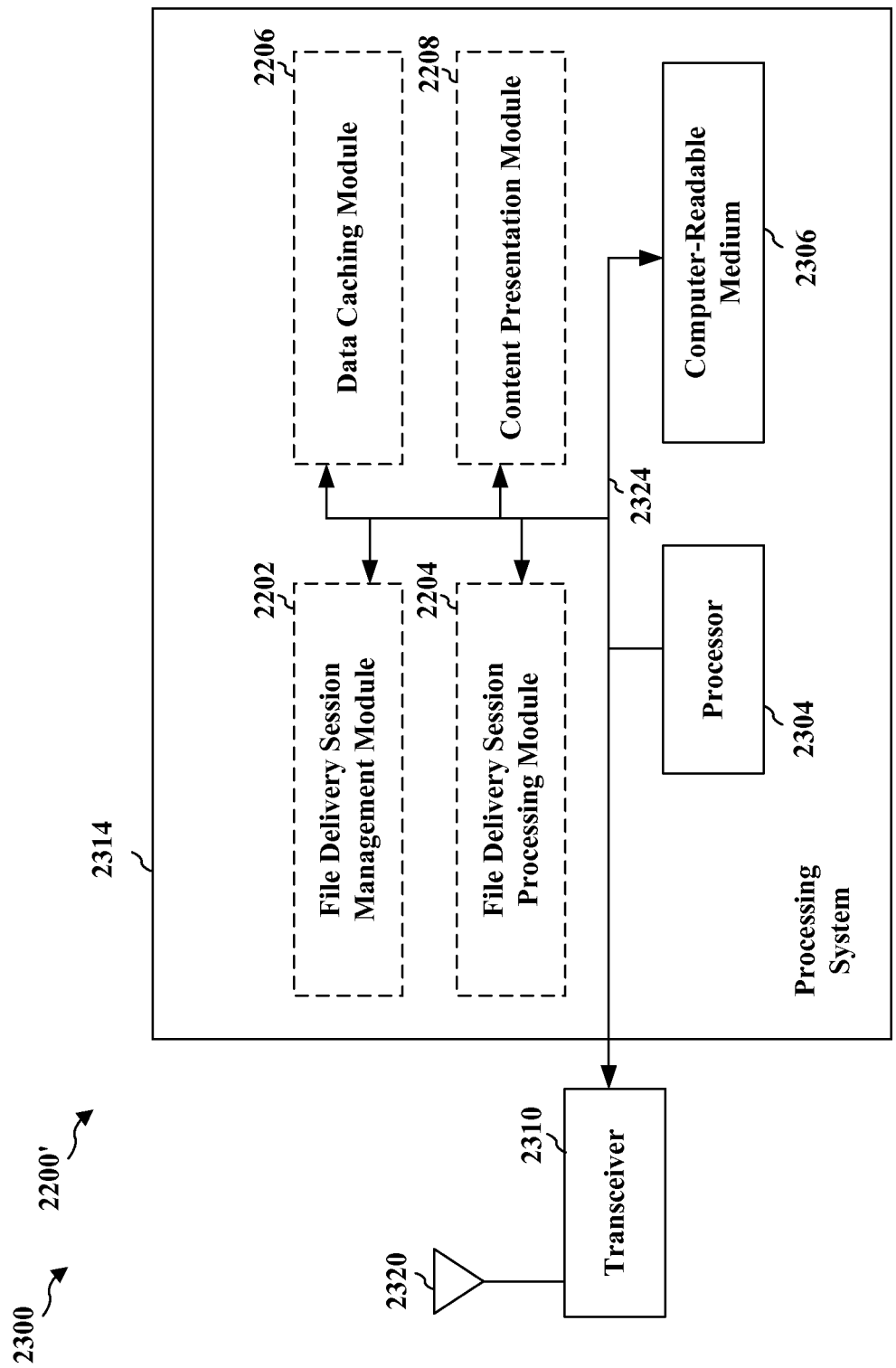
FIG. 23 is a diagram illustrating an example of a hardware implementation for an apparatus employing a processing system.

FIG. 23 is a diagram 2300 illustrating an example of a hardware implementation for an apparatus 2200' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2202, 2204, 2206, and 2208, and the computer-readable medium 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes at least one of the modules 2202, 2204, 2206, and 2208. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

In one configuration, the apparatus 2200 for wireless communication includes means to activate a file delivery session in an eMBMS network for a broadcast DASH service, such means may include, e.g., file delivery session management module 2202. The apparatus further includes means for receiving a plurality of data fragments in the file delivery session comprising at least one initialization segment description fragment, wherein the at least one initialization segment description fragment is associated with at least one media segment transmitted in another file delivery session. Such means may include, e.g., file delivery session processing module 2204. The apparatus may further include means for caching the at least one initialization segment description fragment, such means may include, e.g., data caching module 2206. The means for receiving may further receive a second initialization segment description fragment associated with at least one second media segment.

The aforementioned means may be one or more of the aforementioned modules of the apparatus 2200 and/or the processing system 2314 of the apparatus 2200' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 24:
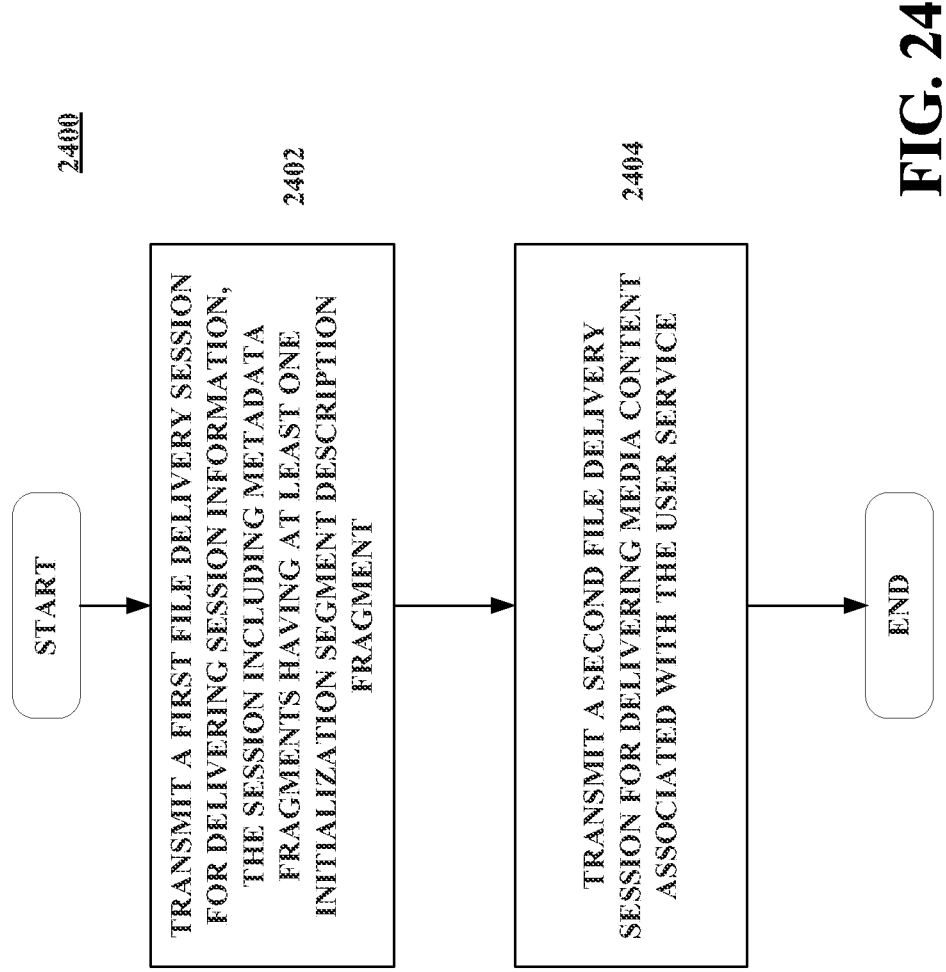
FIG. 24 is a flow chart of a process for transmission of initialization and media segments in accordance with an exemplary approach.

FIG. 24 is a flow diagram 2400 of the eMBMS network generation and transmission of initialization segment description fragments, e.g., as a USD metadata fragment, along with the transmission of media segments on separate FLUTE sessions for reception by a wireless device. The flow diagram of FIG. 24 may be performed by a Broadcast Multicast Service Center (BM-SC), for example. At step 2402, the BM-SC transmits a first file delivery session (e.g., a FLUTE session) defined in a broadcast network for system information. The first file delivery session includes a plurality of metadata fragments, the metadata fragments including at least one initialization segment description fragment associated with a user service.

At step 2404, transmits a second file delivery session in the broadcast network for delivering media content associated with the user service. The initialization segment description fragment may be required to decode at least one media segment also associated with the service and transmitted in the second file delivery session.

Prior to transmitting the first and second file delivery session, the BM-SC may activate the file delivery sessions. The BM-SC activates the file delivery sessions by initiating broadcast of content over a download delivery session according to a time schedule, the time schedule being announced in the corresponding USD/SI. The BM-SC may also generate a plurality of metadata fragments for the file delivery session including at least one initialization segment description fragment.

Similar to the flow diagram of FIG. 22, the first and second file delivery sessions may each comprise a FLUTE session. The FLUTE session may comprise a sequence of service bundle metadata fragments that reference a session description protocol and a media presentation description fragment for a plurality of user services in addition to the initialization data segment. The broadcast network may comprise an eMBMS network for a broadcast DASH service.

The BM-SC may optionally transmit a USD file delivery session comprising at least one USD data fragment. The USD data fragment may comprise a delivery method data parameter that indicates that the at least one initialization data segment is carried in a file delivery session different from the USD file delivery session. For example, the delivery method data parameter may comprise a URI for the initialization data segment, or the delivery method data parameter may include an attribute that indicates the at least one initialization data segment is carried in the different file delivery session when the at least one attribute is set to a predetermined value.

The plurality of metadata fragments may comprise a USD data fragment. For example, the initialization segment description fragment is carried in the file delivery session for system information by convention. The file delivery session may include an attribute that indicates that the initialization segment description fragment is carried in the file delivery session, which includes the USD, when the attribute is set to a predetermined value. The initialization segment description fragment may be referenced in an MPD, e.g., the MPD may comprise a plurality of URIs, each of the plurality of URIs indicating an identity and a network location of at least one of an initialization segment description fragment or a media segment. For example, the URI may comprise a URL. The location of the initialization data segment may comprise information indicating that the initialization data segment is to be transmitted in at least one of a file delivery session comprising system information data or as an initialization data segment in a file delivery session for the user service.

In order to enable backward compatibility with existing UEs, the initialization segments may be sent in a file delivery session interspersed with media segments and as initialization segment description fragments in a separate file delivery session for system information. Thus, the UE may further receive at least one initialization data segment interspersed in the same file delivery session as the at least one media segment.

Figure 25:
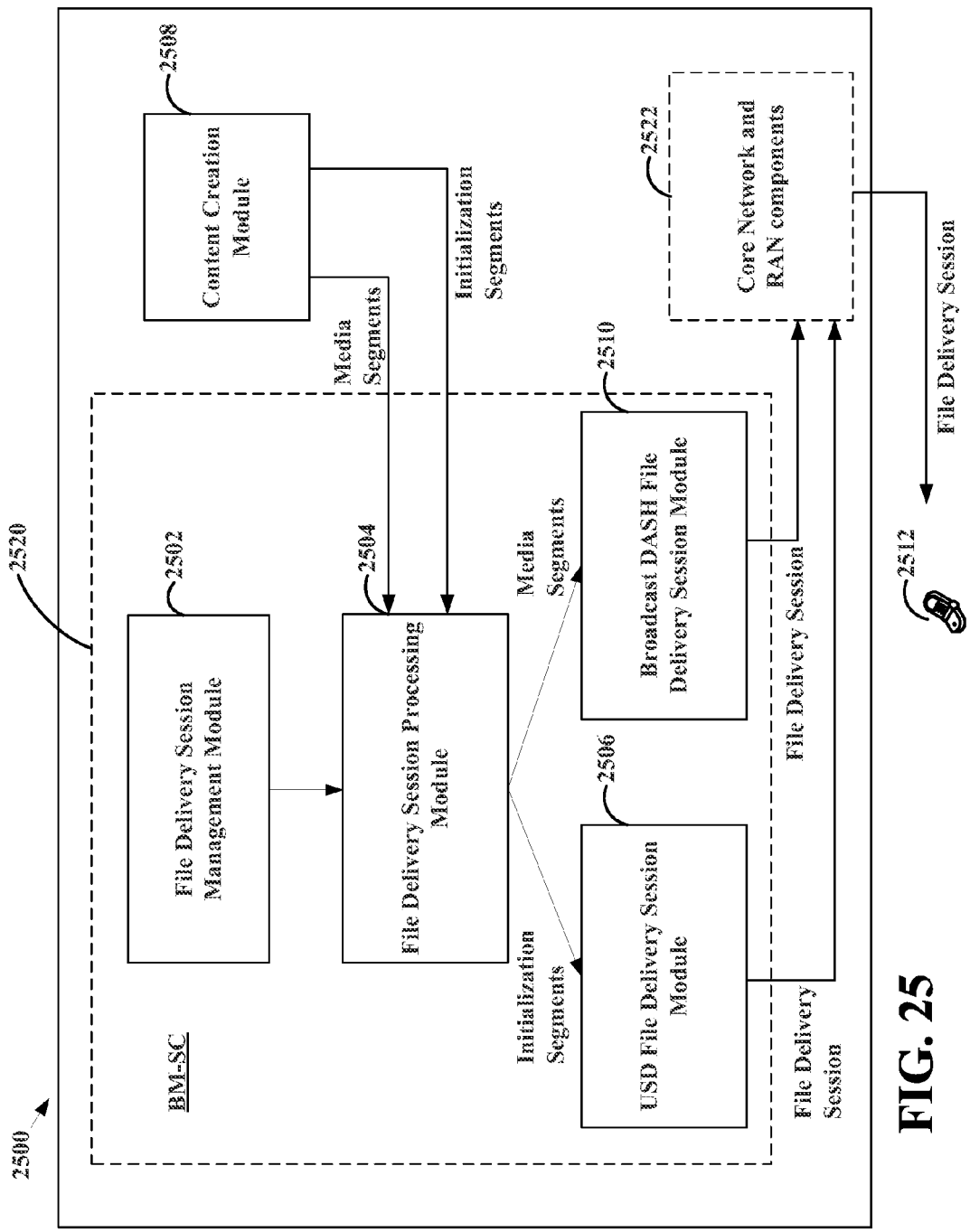
FIG. 25 is a conceptual block diagram illustrating the functionality of an exemplary apparatus for creating and transmitting initialization and media segments.

FIG. 25 is a conceptual data flow diagram illustrating the data flow between different modules/means/components in an exemplary apparatus 2500. The apparatus corresponds to a network side apparatus, and may include at least a DASH encoder, MPD generator, MPD generator, and a BM-SC 2520. The apparatus 2500 may further include other Core Network and RAN entities 2522 such as an MBMS Gateway, an MME, an MCE, and eNB.

The apparatus 2500 includes a file delivery session management module 2502 that is configured to activate a file delivery session in an eMBMS network for a broadcast DASH service. The apparatus 2500 further includes a file delivery session processing module 2504 that is configured to process a plurality of files (metadata fragments if the session is used for USD, or DASH segments if the session is used to deliver DASH streaming content) in the file delivery session. The file delivery session processing module receives media segments and initialization segments from a content creation module 2508, and processes the segments to prepare the segments to be transmitted to a UE. The file delivery session processing module thereafter provides the initialization segments and the media segments to their respective delivery modules. For a USD transport, the plurality of metadata fragments including at least one initialization segment description fragment, wherein the at least one initialization segment description fragment is associated with a user service and with at least one media segment transmitted in another file delivery session. The apparatus 2500 includes a content creation module 2508 that is used to create the at least one media segment for playback as well as the associated initialization segments. It should be noted that the various types of segments may be received from a content server for transmission. Whether the segments are received from a local source such as the content creation module 2508 or received from another source such as the content server, the various segments may be cached for multiple transmissions. For example, the initialization segments may be cached since they are broadcast repeatedly, like in a carrousel, as are all the USD metadata fragments. The initialization segment description fragments may be transmitted to UE 2512 in a USD File Delivery Session via USD File Delivery Session Module 2506 or may alternately initialization data segments may be transmitted in the file delivery session for the user service. For a media segment transport, the at least one media segment associated with an initialization segment description fragment delivered in the USD is transmitted via a separate broadcast DASH file delivery session via broadcast DASH file delivery session module 2510. As such, each step in the aforementioned flow chart of FIG. 24 may be performed by a module and the apparatus 2500 may include one or more of those modules.

Figure 26:
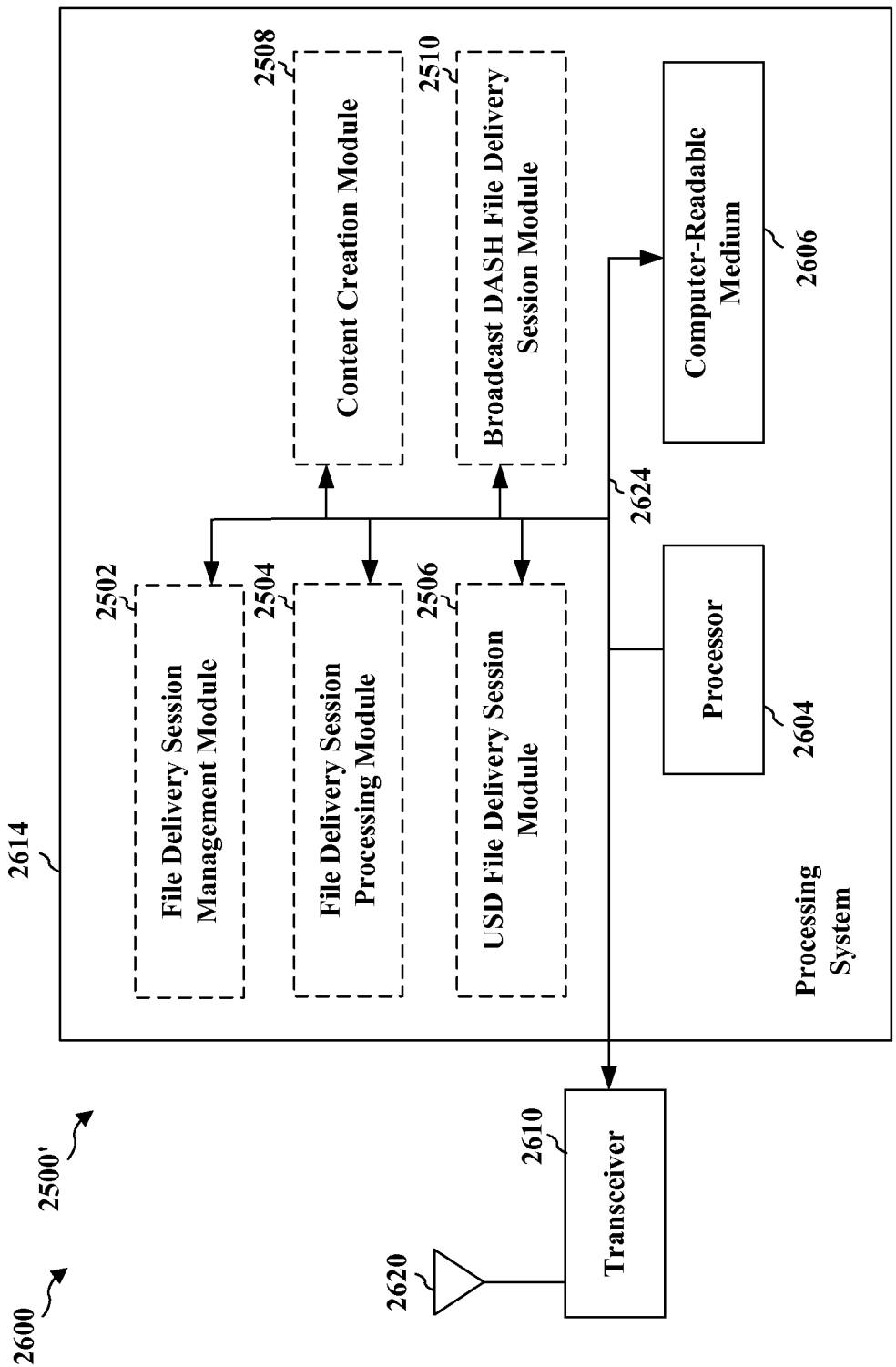
FIG. 26 is a diagram illustrating an example of a hardware implementation for an apparatus employing a processing system.

FIG. 26 is a diagram 2600 illustrating an example of a hardware implementation for an apparatus 2500' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware modules, represented by the processor 2604, the modules 2502, 2504, 2506, 2508, and 2510, and the computer-readable medium 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The processing system 2614 includes a processor 2604 coupled to a computer-readable medium 2606. The processor 2604 is responsible for general processing, including the execution of software stored on the computer-readable medium 2606. The software, when executed by the processor 2604, causes the processing system 2614 to perform the various functions described supra for any particular apparatus. The computer-readable medium 2606 may also be used for storing data that is manipulated by the processor 2604 when executing software. The processing system further includes at least one of the modules 2502, 2504, 2506, 2508, and 2510. The modules may be software modules running in the processor 2604, resident/stored in the computer readable medium 2606, one or more hardware modules coupled to the processor 2604, or some combination thereof. The processing system 2514 may be a component of the eNB 610 and may include the memory 676 and/or at least one of the TX processor 616, the RX processor 670, and the controller/processor 675.

In one configuration, the apparatus 2500/2500' for wireless communication includes means for transmitting a first file delivery session in a broadcast network for delivering system information, the first file delivery session including a plurality of metadata fragments, the metadata fragments including at least one initialization segment description fragment associated with a user service, and means for transmitting a second file delivery session in the broadcast network for delivering media content associated with the user service, e.g., including any of file delivery session management module 2502, file delivery session content creation module 2508 and/or file delivery session processing module 2504, USD delivery session module 2506, and broadcast DASH file delivery session module 2510.

The aforementioned means may be one or more of the aforementioned modules of the apparatus 2500 and/or the processing system 2614 of the apparatus 2500' configured to perform the functions recited by the aforementioned means. As described supra, the processing system 2514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
    activating a first file delivery session in a broadcast network for system information to enable service discovery of a user service broadcast in a second broadcast file delivery session; and
    receiving a plurality of metadata fragments in the first file delivery session based on the activation, the plurality of metadata fragments comprising at least one media presentation description (MPD) fragment and at least one initialization segment description fragment, wherein the at least one initialization segment description fragment is associated with at least one media segment transmitted in the second file delivery session for the user service, wherein the at least one initialization segment description fragment comprises information to playback the at least one media segment.

2. The method of claim 1, wherein the initialization segment description fragment is referenced in a media presentation description fragment.

3. The method of claim 2, wherein the media presentation description fragment comprises a plurality of Uniform Resource Identifiers (URIs), each of the plurality of URIs representing an identity and a network location of at least one of an initialization segment description fragment and a media segment.

4. The method of claim 3, wherein the URI of the initialization data segment comprises information indicating that the initialization segment description fragment is to be transmitted as system information in at least one of a file delivery session transmitting system information data or as an initialization data segment in a file delivery session for the user service.

5. The method of claim 1, wherein the first file delivery session comprises a file delivery over unidirectional transport (FLUTE) session.

6. The method of claim 5, wherein the FLUTE session comprises a sequence of service bundle metadata fragments that reference a set of session description information and a media presentation description fragment for at least one user service in addition to the initialization segment description fragment.

7. The method of claim 1, wherein the plurality of metadata fragments further comprises at least one user service discovery metadata fragment.

8. The method of claim 7, wherein the at least one user service discovery metadata fragment comprises a delivery method data parameter that indicates the at least one initialization segment description fragment is carried in a file delivery session for system information that is different from a file delivery session defined for a user service.

9. The method of claim 8, wherein the at least one initialization segment description fragment is carried in the file delivery session for system information by convention.

10. The method of claim 8, wherein the delivery method data parameter comprises at least one uniform resource identifier (URI) for the at least one initialization segment description fragment.

11. The method of claim 8, wherein the delivery method data parameter comprises at least one attribute that indicates the at least one initialization segment description fragment is carried in the file delivery session for system information when the at least one attribute is set to a predetermined value.

12. The method of claim 1, further comprising caching the at least one initialization segment description fragment.

13. The method of claim 12, further comprising:
activating a second file delivery session in the broadcast network for broadcast delivery of a user service comprising Dynamic Adaptive Streaming over HTTP (DASH) formatted media content;
receiving at least one second media segment transmitted in the second file delivery session; and
decoding the at least one second media segment using the cached initialization segment description fragment.

14. The method of claim 1, further comprising receiving a second initialization segment description fragment associated with at least one second media segment.

15. The method of claim 14, further comprising:
activating a second file delivery session in the broadcast network for a broadcast Dynamic Adaptive Streaming over HTTP (DASH) service;
receiving at least one second media segment transmitted in the second file delivery session; and
decoding the at least one second media segment using a cached second initialization segment description fragment.

16. The method of claim 1, further comprising:
receiving the initialization segment description fragment interspersed in the same file delivery session as the at least one media segment.

17. The method of claim 1, wherein the broadcast network comprises an evolved Multimedia Broadcast Multicast Service (eMBMS) network.

18. An apparatus for wireless communication, comprising:
means for activating a first file delivery session in a broadcast network for system information to enable service discovery of a user service broadcast in a second broadcast file delivery session; and
means for receiving a plurality of metadata fragments in the first file delivery session based on the activation, the plurality of metadata fragments comprising at least one media presentation description (MPD) fragment and at least one initialization segment description fragment, wherein the at least one initialization segment description fragment is associated with at least one media segment transmitted in the second file delivery session for the user service, wherein the at least one initialization segment description fragment comprises information to playback the at least one media segment.

19. The apparatus of claim 18, wherein the initialization segment description fragment is referenced in a media presentation description fragment, wherein the media presentation description fragment comprises a plurality of Uniform Resource Identifiers (URIs), each of the plurality of URI representing an identity and network location of at least one of an initialization data segment or a media segment, and wherein the URI of the initialization segment description fragment comprises information indicating that the initialization segment description fragment is to be transmitted as system information in at least one of a file delivery session transmitting system information data or as an initialization data segment in a file delivery session for the user service.

20. The apparatus of claim 18, wherein the first file delivery session comprises a file delivery over unidirectional transport (FLUTE) session, the apparatus further comprising means for caching the at least one initialization segment description fragment.

21. The apparatus of claim 18, wherein the plurality of metadata fragments further comprises at least one user service discovery metadata fragment.

22. The apparatus of claim 21, wherein the at least one user service discovery metadata fragment comprises a delivery method data parameter that indicates the at least one initialization segment description fragment is carried in a file delivery session for system information that is different from a file delivery session defined for a user service.

23. The apparatus of claim 22, wherein the at least one initialization segment description fragment is carried in the file delivery session for system information by convention.

24. The apparatus of claim 22, wherein the delivery method data parameter comprises at least one uniform resource identifier for the at least one initialization segment description fragment.

25. The apparatus of claim 22, wherein the delivery method data parameter comprises at least one attribute that indicates the at least one initialization segment description fragment is carried in the file delivery session for system information when the at least one attribute is set to a predetermined value.

26. The apparatus of claim 18, wherein the means for receiving further receives a second initialization segment description fragment associated with at least one second media segment.

27. An apparatus for wireless communication, comprising:
a memory; and
at least one processor coupled to the memory and configured to:
activate a first file delivery session with a server in a broadcast network for system information to enable service discovery of a user service broadcast in a second broadcast file delivery session; and
receive a plurality of metadata fragments in the first file delivery session based on the activation, the plurality of metadata fragments comprising at least one media presentation description (MPD) fragment and at least one initialization segment description fragment, wherein the at least one initialization segment description fragment is associated with at least one media segment transmitted in the second file delivery session for the user service, wherein the at least one initialization segment description fragment comprises information to playback the at least one media segment.

28. The apparatus of claim 27, wherein the initialization segment description fragment is referenced in a media presentation description.

29. The apparatus of claim 28, wherein the media presentation description comprises a plurality of Uniform Resource Identifiers (URIs), each of the plurality of URI representing an identity and a network location of at least one of an initialization segment description fragment or a media segment.

30. The apparatus of claim 29, wherein the URI of the initialization data segment comprises information indicating that the initialization segment description fragment is to be transmitted as system information in at least one of a file delivery session transmitting system information data or as an initialization data segment in a file delivery session for the user service.

31. The apparatus of claim 27, wherein the first file delivery session comprises a file delivery over unidirectional transport (FLUTE) session.

32. The apparatus of claim 27, wherein the plurality of metadata fragments further comprises at least one user service discovery metadata fragment.

33. The apparatus of claim 32, wherein the at least one user service discovery metadata fragment comprises a delivery method data parameter that indicates the at least one initialization segment description fragment is carried in a file delivery session for system information that is different from a file delivery session defined for a user service.

34. The apparatus of claim 33, wherein the at least one initialization segment description fragment is carried in the file delivery session for system information by convention.

35. The apparatus of claim 33, wherein the delivery method data parameter comprises at least one uniform resource identifier (URI) for the at least one initialization segment description fragment.

36. The apparatus of claim 33, wherein the delivery method data parameter comprises at least one attribute that indicates the at least one initialization segment description fragment is carried in the file delivery session for system information when the at least one attribute is set to a predetermined value.

37. The apparatus of claim 27, wherein the processing system is further configured to cache the at least one initialization segment description fragment.

38. The apparatus of claim 27, wherein the processing system is further configured to receive a second initialization segment description fragment associated with at least one second media segment.

39. A computer-readable medium comprising code that when executed on at least one processor causes the at least one processor to:
activate a first file delivery session with a server in a broadcast network for system information to enable service discovery of a user service broadcast in a second broadcast file delivery session; and
receive a plurality of data fragments in the first file delivery session based on the activation, the plurality of data fragments comprising at least one media presentation description (MPD) fragment and at least one initialization segment description fragment, wherein the at least one initialization segment description fragment is associated with at least one media segment transmitted in the second file delivery session for the user service, wherein the at least one initialization segment description fragment comprises information to playback the at least one media segment.

40. A method for wireless communication, comprising:
transmitting a first file delivery session in a broadcast network for delivering system information to enable service discovery of a user service broadcast in a second broadcast file delivery session, the first file delivery session comprising a plurality of metadata fragments, the metadata fragments comprising at least one media presentation description (MPD) fragment and at least one initialization segment description fragment associated with the user service; and
transmitting the second file delivery session in the broadcast network for delivering media content associated with the user service, wherein the at least one initialization segment description fragment comprises information to playback the media content.

41. The method of claim 40, wherein the initialization segment description fragment is referenced in a media presentation description.

42. The method of claim 41, wherein the media presentation description comprises a plurality of Uniform Resource Identifiers (URIs), each of the plurality of URIs representing an identity and a network location of at least one of an initialization segment description fragment and a media segment.

43. The method of claim 42, wherein the URI of initialization segment description fragment comprises information indicating that the initialization segment description fragment is to be transmitted as system information in at least one of a file delivery session transmitting system information data or as an initialization data segment in a file delivery session for the user service.

44. The method of claim 40, wherein the first and second file delivery sessions comprise a file delivery over unidirectional transport (FLUTE) session.

45. The method of claim 40, wherein the plurality of metadata fragments further comprises at least one user service discovery metadata fragment.

46. The method of claim 45, wherein the at least one user service discovery metadata fragment comprises a delivery method data parameter that indicates the at least one initialization segment description fragment is carried in a file delivery session for system information that is different from a file delivery session defined for a user service.

47. The method of claim 46, wherein the at least one initialization segment description fragment is carried in the file delivery session for system information by convention.

48. The method of claim 46, wherein the delivery method data parameter comprises at least one uniform resource identifier (URI) for the at least one initialization segment description fragment.

49. The method of claim 46, wherein the delivery method data parameter comprises at least one attribute that indicates the at least one initialization segment description fragment carried in the file delivery session for system information when the at least one attribute is set to a predetermined value.

50. An apparatus for wireless communication, comprising:
means transmitting a first file delivery session in a broadcast network for delivering system information to enable service discovery of a user service broadcast in a second broadcast file delivery session, the first file delivery session comprising a plurality of metadata fragments, the metadata fragments comprising at least one media presentation description (MPD) fragment and at least one initialization segment description fragment associated with the user service; and
means for transmitting the second file delivery session in the broadcast network for delivering media content associated with the user service, wherein the at least one initialization segment description fragment comprises information to playback the media content.

51. An apparatus for wireless communication, comprising:
a memory; and
at least one processor coupled to the memory configured to:
transmit a first file delivery session in a broadcast network for delivering system information to enable service discovery of a user service broadcast in a second broadcast file delivery session, the first file delivery session comprising a plurality of metadata fragments, the metadata fragments comprising at least one media presentation description (MPD) fragment and at least one initialization segment description fragment associated with the user service; and
transmit the second file delivery session in the broadcast network for delivering media content associated with the user service, wherein the at least one initialization segment description fragment comprises information to playback the media content.

52. The apparatus of claim 51, wherein the initialization segment description fragment is referenced in a media presentation description.

53. The apparatus of claim 52, wherein the media presentation description comprises a plurality of Uniform Resource Identifiers (URIs), each of the plurality of URIs representing an identity and a network location of at least one of initialization segment description fragment and a media segment.

54. The apparatus of claim 53, wherein the URI of initialization segment description fragment comprises information indicating that the initialization segment description fragment is to be transmitted as system information in at least one of a file delivery session transmitting system information data or as an initialization data segment in a file delivery session for the user service.

55. The apparatus of claim 51, wherein the first and second file delivery sessions comprise a file delivery over unidirectional transport (FLUTE) session.

56. The apparatus of claim 51, wherein the plurality of metadata fragments further comprises at least one user service discovery metadata fragment.

57. The apparatus of claim 56, wherein the at least one user service discovery metadata fragment comprises a delivery method data parameter that indicates the at least one initialization segment description fragment is carried in a file delivery session for system information that is different from a file delivery session defined for a user service and different from the second file delivery session.

58. The apparatus of claim 57, wherein the at least one initialization segment description fragment is carried in the file delivery session for system information by convention.

59. The apparatus of claim 57, wherein the delivery method data parameter comprises at least one uniform resource identifier (URI) for the at least one initialization segment description fragment.

60. The apparatus of claim 57, wherein the delivery method data parameter comprises at least one attribute that indicates the at least one initialization segment description fragment carried in the file delivery session for system information when the at least one attribute is set to a predetermined value.

61. A computer-readable medium comprising code that when executed on at least one processor causes the at least one processor to:
transmit a first file delivery session in a broadcast network for delivering system information to enable service discovery of a user service broadcast in a second broadcast file delivery session, the first file delivery session comprising a plurality of metadata fragments, the metadata fragments comprising at least one media presentation description (MPD) fragment and at least one initialization segment description fragment associated with the user service; and
transmit the second file delivery session in the broadcast network for delivering media content associated with the user service, wherein the at least one initialization segment description fragment comprises information to playback the media content.

* * * * *